(12) United States Patent
Lagar-Cavilla et al.

(10) Patent No.: US 8,611,213 B1
(45) Date of Patent: Dec. 17, 2013

(54) TRANSMITTING DELAY-TOLERANT DATA WITH OTHER NETWORK TRAFFIC

(75) Inventors: Horacio Andres Lagar-Cavilla, Toronto (CA); Kaustubh Joshi, Scotch Plain, NJ (US); Alex Varshavsky, East Hanover, NJ (US)

(73) Assignee: AT&T Intelletual Property I, L.P., Atlanta, GA (US)

( * ) Notice: Subject to any disclaimer, the term of this patent is extended or adjusted under 35 U.S.C. 154(b) by 0 days.

(21) Appl. No.: 13/486,574

(22) Filed: Jun. 1, 2012

(51) Int. Cl.
*G06F 11/00* (2006.01)
(52) U.S. Cl.
USPC ........ 370/229; 370/238; 370/252; 455/422.1; 455/445
(58) Field of Classification Search
None
See application file for complete search history.

(56) References Cited

U.S. PATENT DOCUMENTS

| 8,009,557 B2 * | 8/2011 | Curran-Gray et al. | 370/229 |
|---|---|---|---|
| 2002/0114342 A1 * | 8/2002 | Yao | 370/429 |
| 2007/0177628 A1 * | 8/2007 | Choi et al. | 370/469 |
| 2007/0253441 A1 * | 11/2007 | Curran-Gray et al. | 370/464 |
| 2010/0061243 A1 * | 3/2010 | Yi et al. | 370/235 |
| 2010/0142421 A1 * | 6/2010 | Schlicht et al. | 370/310 |
| 2010/0202469 A1 * | 8/2010 | Isaksson et al. | 370/412 |
| 2011/0199934 A1 * | 8/2011 | Olofsson et al. | 370/252 |
| 2012/0051289 A1 * | 3/2012 | Dwyer et al. | 370/328 |
| 2012/0120858 A1 * | 5/2012 | Das et al. | 370/311 |
| 2012/0281561 A1 * | 11/2012 | Shukla et al. | 370/252 |

OTHER PUBLICATIONS

3GPP. Fast Dormancy: a Way Forward. http://bit.ly/itBSjj.
3GPP. Release 1999, 2 pages. http://bit.ly/IMYpxT.
Balasubramanian, et al., Augmenting Mobile 3G Using WiFi. In Proc. Mobisys, Jun. 2010, 13 pages.
Balasubramanian, et al., Energy Consumption in Mobile Phones: A Measurement Study and Implications for Network Applications. In Proc. IMC, Chicago, IL, Nov. 2009, 14 pages.
Braden, "Requirements for Internet Hosts—Communication Layers". RFC 1122, Oct. 1989. Updated by RFCs 1349, 4379, 5884, 6093, 116 pages.
"Mobile Broadband: The Benefits of Additional Spectrum". F. C. Commission, Oct. 2010, 27 pages. http://bit.ly/9ia36u.
"Motorola Chief Pins Android Phone Returns on Poor Apps". Electronista, 10 pages. http://bit.ly/IMByCF.
"What's Really Causing the Capacity Crunch?" FierceWireless.com, 5 pages. http://bit.ly/bUN9MX.
"Adding Fast Dormancy Support to Infineon Modem". Ofono.org, 2 page. http://bit.ly.lrthjy.
Portokalidis, et al., "Paranoid Android: Versatile Protection for Smartphones". In Proc. 26th ACSAC, 2010, 10 pages.
Qian, et al., "Top: Tail Optimization Protocol for Cellular Radio Resource Allocation". In Proc. ICNP, Tokyo, Japan, Oct. 2010, 10 pages.

(Continued)

*Primary Examiner* — Rafael Pérez-Gutiérrez
*Assistant Examiner* — Keith Fang
(74) *Attorney, Agent, or Firm* — Turocy & Watson, LLP

(57) ABSTRACT

The disclosed subject matter relates to an architecture that can opportunistically leverage existing periods of inactivity or low activity for sending data at virtually no marginal cost. In particular, the architecture can receive data that is to be transmitted over a communications network. The data can be examined to determine whether or not the data is delay-tolerant. If so, then such data can be stored to a staging queue. The data can then be transmitted at a later time, particularly during a high-energy state facilitated by a different data transaction, but for which there are inactive or low-activity times.

20 Claims, 15 Drawing Sheets

(56) References Cited

OTHER PUBLICATIONS

Qian, et al., "Profiling Resource Usage for Mobile Applications: a Cross-layer Approach". In Proc. of Mobisys, Washington, DC, Jun. 2011, 14 pages.

Roy, et al., "Energy Management in Mobile Devices with the Cinder Operating System". In Proc. of Eurosys, Salzburg, Austria, Apr. 2011, 15 pages.

"Transmission Time Interval". Wikipedia, 1 pages. http://bit.ly/kNIyMH.

* cited by examiner

TRANSMITTING DELAY-TOLERANT DATA WITH OTHER NETWORK TRAFFIC

TECHNICAL FIELD

The present application relates generally to opportunistically leveraging existing periods of inactivity or low activity for sending data at reduced cost in terms of resource utilization.

BACKGROUND

Wide adoption of mobile devices along with ubiquitous cellular data coverage has resulted in an explosive growth of mobile applications that expect always-accessible wireless networking. This explosion has placed strains on resources that are scarce in the mobile world: handheld battery life and cellular network capacity. On the user side, poor battery life due to non-optimized mobile apps has been blamed for user dissatisfaction and phone returns. On the network side, the growth rate of mobile data is outstripping the rate at which new cellular wireless capacity is being added, leading to proposals for optimization of data use through techniques such as WI-FI offloading.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

In some embodiments, a system can execute instructions associated with receiving data to be transmitted by way of a communications network. Instructions can be executed to determine if the data is tolerant to a delay and to store the data to a staging queue in the event the data is tolerant to the delay. Instructions can also be executed to transmit the data by way of the communications network during an inactive period associated with a different communications transaction.

In other embodiments, a method can be provided. The method can include receiving transmission data identified for transmission by way of a communications network and determining that the transmission data is delay-tolerant. The method can also include storing the transmission data in a queue in response to the transmission data being determined to be delay-tolerant. The method can transmit the transmission data over the communications network during an inactive period associated with a different communication transaction.

In some embodiments, a non-transitory computer-readable storage medium including computer-executable instructions can be provided. Such instructions can cause a computing system including a processor to receive transmission data to be transmitted via a communications network and to determine that the transmission data is tolerant to a delay. The instructions can also facilitate maintaining the transmission data in a queue in response to the transmission data being determined to be tolerant to the delay and to transmit the transmission data via the communications network during an inactive period associated with a different communication transaction.

The following description and the annexed drawings set forth in detail certain illustrative aspects of the disclosed subject matter. These aspects are indicative, however, of but a few of the various ways in which the principles of the disclosed subject matter may be employed and the disclosed subject matter is intended to include all such aspects and their equivalents. Other advantages and distinguishing features of the disclosed subject matter will become apparent from the following detailed description of the disclosed subject matter when considered in conjunction with the drawings.

DETAILED DESCRIPTION

Overview

Figure 1:
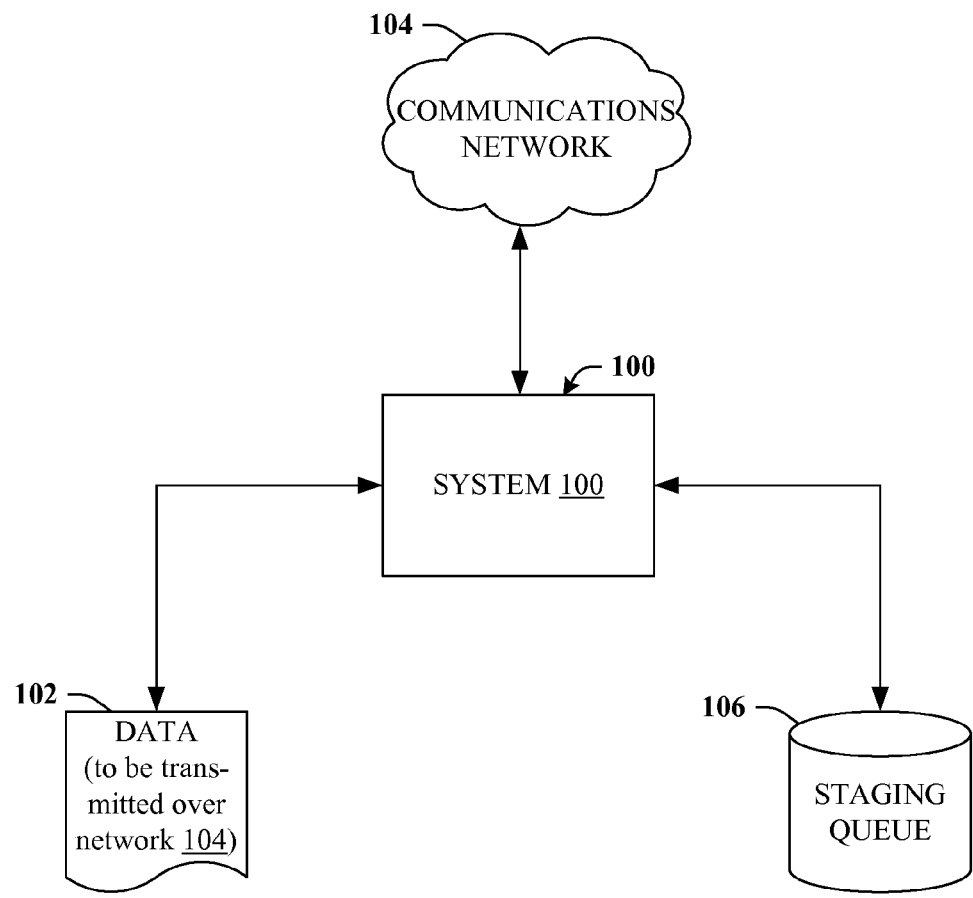
FIG. 1 is a block diagram of a system that can leverage periods of inactivity that would otherwise exist for sending delay-tolerant data FIG. 2 provides a block diagram of an example system with various techniques for determining data to be delay-tolerant.

Because the acquisition of cellular network resources incurs large signaling and latency costs (e.g., up to 2 seconds), resources are reserved for several seconds once in use. The extra time at the end of a reservation is usually called the "tail", and is a tool to minimize signaling costs when traffic is intermittent yet somewhat closely spaced. Thus, depending on the precise timing of data streams, network usage characteristics such as energy requirements, latency, and bandwidth vary widely, even within a single location. Ignoring these dynamics can result in significant wastage of scarce network resources and energy. For example, it has recently been shown that for a popular music streaming mobile application, 3.6% of the traffic consumes 64.1% of the network device energy and produces the vast majority of the network signaling.

On the user side, one of the primary drains of a battery for a mobile device is the communication radio/modem. Mobile operating systems that manage these and other resources typically are very aggressive in turning these resources off when not in use in order to prolong battery life for the end user. However, when the user makes a call or accesses the service provider's network for another reason, the radio must be powered up. Switching the radio on to a higher powered state reduces battery life for the mobile device, and is also extremely taxing on the service provider's network, as a great deal of signaling occurs in order to initiate the connection.

Therefore, from the perspective of the mobile device, the mobile operating system can increase battery life by switching the radio off immediately after use, and switching back on only when additional data needs to be transferred, even though sometimes such might occur only moments later. Indeed, this is the approach of many of today's application designers. However, from the perspective of the mobile service provider, such is too costly in terms of resources since once the initial signaling has established a connection, it is preferable to maintain the connection slightly longer to receive additional data rather than allowing the device to switch the radio off, then back on (potentially) only after a few moments. As a result, most mobile service providers choose a compromise between utilization of their own resources and those of the mobile device.

Typically, service providers place a limit on the number of times a mobile device can turn their radios on/off within a given period. While the actual settings might differ among carriers/service providers, such constraints are generally encoded by a state machine that describes the different power states and the transition times required before transferring to another state. For example, conventional service providers require that once a radio switches to its highest powered state, that high-powered state must be maintained for a certain time, generally several seconds after the last byte of data has been transmitted. This is known as an idle time-out period in which the radio of a mobile device is powered up, the connection is maintained, yet no data is being exchanged However, the connection is maintained in this idle time-out state in the event some data does need to be exchanged, since it is preferred that the radio stay on a few moments longer than to take the risk that by shutting down the radio, the radio will need to be powered up again (and concomitant signaling with the host network) immediately thereafter.

In the aggregate, these idle time-out periods account for a significant amount of time, and are not likely to be dispensed with by service providers because of the high cost of establishing a new connection after a previous one is terminated. Hence, in view of the fact that these idle time-out periods exist in conventional communications networks, the disclosed subject matter describes systems and methods to leverage these periods for opportunistic use, thereby enabling both the mobile device and the host network to operate more efficiently.

For example, data traffic can be categorized into two (or more) classes, e.g., interactive and delay-tolerant. Interactive traffic can relate to data that generally requires instantaneous and/or real-time transmission such as calls, web browsing or the like. Data traffic classified as interactive can otherwise behave as already occurs in conventional networks. However, data traffic classified as delay-tolerant, e.g., data exchanges for which there is no need for instantaneous transfer, can behave differently. In particular, delay-tolerant traffic can be stored rather than transmitted immediately. Delay-tolerant traffic need not initiate a change in state of the radio, but rather can be transmitted within the bursts of interactive traffic and therefore leverage unused resources, such as the idle time-out periods that commonly exist. Transmission of delay-tolerant data during transmission of other data is referred to herein as traffic backfilling. Delay-tolerant traffic can relate to, e.g., email checking or other operations, really simple syndication (RSS) checking, ad traffic, update checking, backup and synchronization operations, offload of security checks, readings for cooperative sensing, certain buffered exchanges, and so forth.

In addition, applications or service providers can be afforded additional control such as determining which data or which type of data is classified as either interactive or delay-tolerant. Moreover, control can be extended to determine when to move traffic in or out of delay-tolerant queues, or to trigger eventual transmission of traffic (e.g., clearing) if, e.g., enough delay-tolerant data is accumulated.

Interactive traffic can receive the same (or better) quality of service as usual. Indeed, interactive traffic can be improved because the energy state of the radio/modem and the signaling done to reserve network resources can be utilized to move much more data than otherwise. Specifically, the delay-tolerant data that is staged and waiting to piggyback on a burst can significantly improve overall network efficiency and/or performance. The marginal costs of transmitting the delay-tolerant traffic can be virtually zero, yet significant costs would be required to transmit that data in conventional systems. In fact, experimentation shows that with identical macro-energy states during a given period and with no additional signaling of any kind, an estimated three additional delay-tolerant bytes can be piggybacked for every byte of interactive traffic transmitted over a given communications network.

Traffic Backfilling

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, system 100 that can leverage periods of inactivity that would otherwise exist for sending delay-tolerant data is depicted. Generally, system 100 can include a memory that stores computer-executable instructions and a processor communicatively coupled to the memory that facilitates execution of the computer-executable instructions, examples of which can be found with reference to FIG. 15.

In particular, system 100 can receive data 102 that is to be transmitted by way of communications network 104. Thus, data 102 can relate to any type of data and/or traffic that is exchanged over communications network 104. Communications network 104 can be, e.g., a wireless communications network. It is noted that in conventional systems, when data to be transmitted over the network is acquired, a connection is established between service provider network components and end-user device components. Whether the data is incoming or outgoing the user device powers up an internal radio and the network components process a significant amount of signaling and reserve resources for the exchange.

Instead of immediately initiating a communication session upon receipt of data 102 (as would occur in conventional systems), system 100 can determine if data 102 is delay-tolerant. If data 102 is not delay-tolerant, but rather is interactive, then data 102 can be transmitted as would normally occur. However, if data 102 is delay-tolerant, then data 102 can be stored to staging queue 106.

Staging queue 106 can be embodied as substantially any type of memory and represents a temporary data store where all or portions of data 102 might remain for a few seconds or less to several hours or more depending upon a variety of factors that are further detailed herein. Regardless, at some time after data 102 is stored to staging queue 106, such data can be transmitted over communications network 104. Advantageously, since such data 102 is delay-tolerant, such need not occur upon receipt, but rather can occur at opportunistic times, such as during an inactive period associated with a different communication transaction.

As one example, consider two data exchanges that occur at approximately the same time. The first transaction is a scheduled synchronization operation with a cloud server that is scheduled to occur at 12:00 pm every day and the second is an outgoing phone call by the same user at 12:01 pm. In conventional systems, both of these transactions would initiate a battery power-up and substantial signaling between the device and the network.

However, by employing the disclosed subject matter, resource utilization can be significantly reduced for both the user and the service provider, while still exchanging the same amount of data. In particular, system 100 can identify the sync operation as delay-tolerant, and thus the radio of a user device is not immediately powered up and no signaling with the network is invoked. Rather, data associated with the sync operation is temporarily moved to staging queue 106. One minute later, the user initiates an outgoing call to a friend. Voice calls would likely be deemed interactive (e.g., not delay-tolerant), and thus would not go to staging queue 106. Hence, the voice call can facilitate a radio power-up, network signaling, resource reservation, etc. and all data that would otherwise be exchanged would occur normally. Yet, in addition, during the call, either at moments with spare bandwidth such as the tail of the transaction or another inactive period, data associated with the sync operation can be exchanged as well. Thus, in terms of energy use or other resource utilization, both transactions can occur at a cost that is essentially equal to only a single transaction. Such can be achieved by merely delaying the transaction associated with the sync operation by one minute in this example, which is can be a minimal cost given that the sync operation is in fact delay-tolerant, and further considering wide latitude can be provided in determining what data is or is not delay-tolerant.

Figure 2:
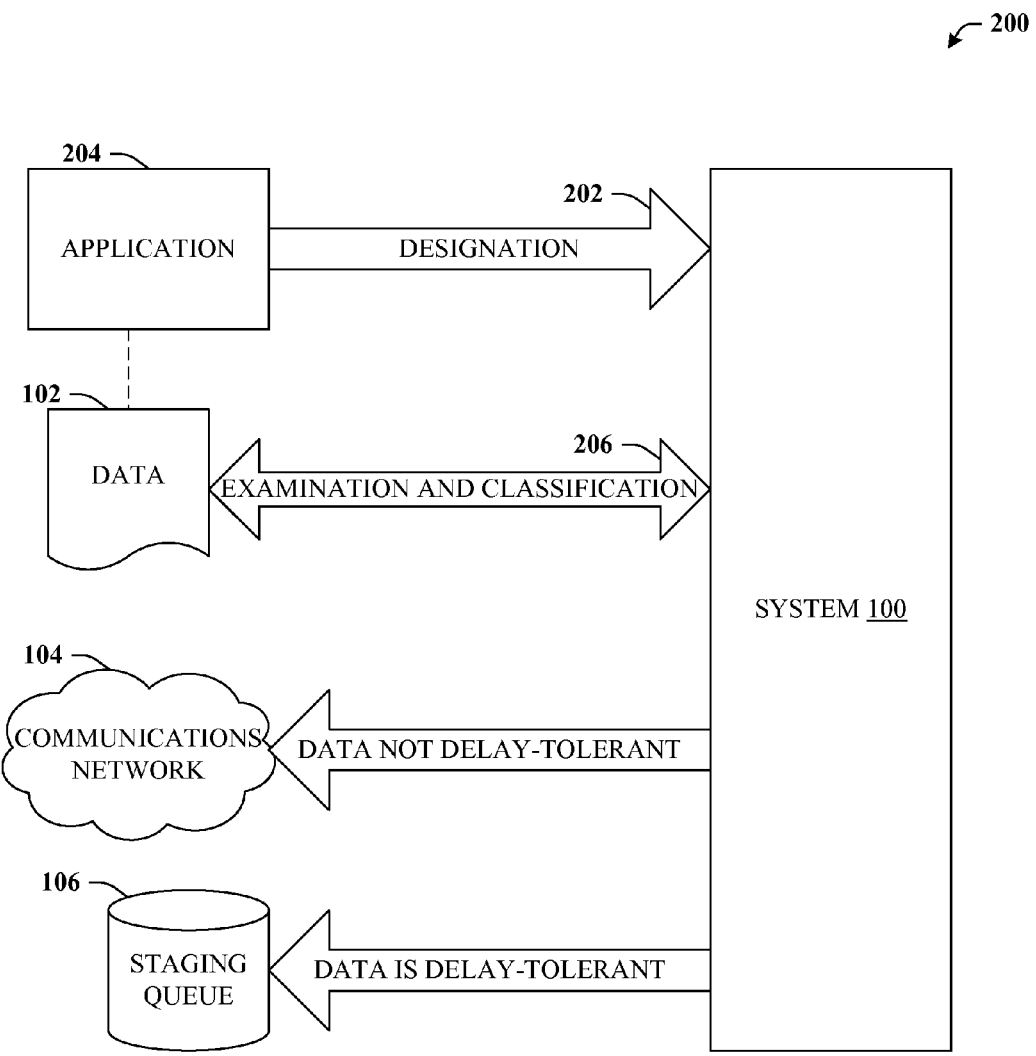

Turning now to FIG. 2, system 200 is depicted. System 200 illustrates various examples of determining data to be delay-tolerant. For instance, in some embodiments, data can be determined to be delay-tolerant based upon designation 202 provided by application 204 that is associated with data 102. In this case, and continuing the previous example, the application associated with the sync operation can designate any such data traffic as delay-tolerant. In contrast, an application and/or core service associated with a phone dialer might on the other hand designate that data as interactive.

In other embodiments, system 100 can examine data 102 and intelligently classify data 102 according to an inferred degree of delay-tolerance. For illustrative purposes, transactions relating to, e.g., web browsing, incoming or outgoing calls, or transactions that are typically expected to be instantaneous can be classified as interactive. Examples of delay-tolerant data can relate to some portions of email transactions, RSS transactions, short message service (SMS) transactions, update/backup/sync operations, offload of security checks, readings for cooperative sensing, and so forth. In some cases even streaming downloads can be delay-tolerant such as when scheduled or when buffered. Likewise, in some cases, certain portions of web browsing can be delay-tolerant such as ad traffic or the like. Ad traffic consumes approximately 60% of the energy used in web browsing application. Thus, if such data were to be classified as delay-tolerant and delayed momentarily (e.g., a few seconds), substantially network-wide savings could be achieved by implementing the disclosed subject matter.

Regardless of which data is classified as delay-tolerant or not or how such is identified, data classified as interactive (e.g., not delay-tolerant) can be propagated by way of communications network 104. Data that is deemed to be delay-tolerant, however, can be stored to staging queue 106 as detailed previously.

In the simplest implementation, the classification for data 102 can be one of two categories: delay-tolerant or interactive. However, it is understood that classification of data as delay-tolerant can also involve various levels of granularity and/or degrees of delay-tolerance. For example, some data 102 might be delay-tolerant up to, e.g., 5 seconds, while other data 102 might be delay-tolerant up to, e.g., 5 minutes, while still other data 102 might be delay-tolerant up to several hours or more.

Figure 3:
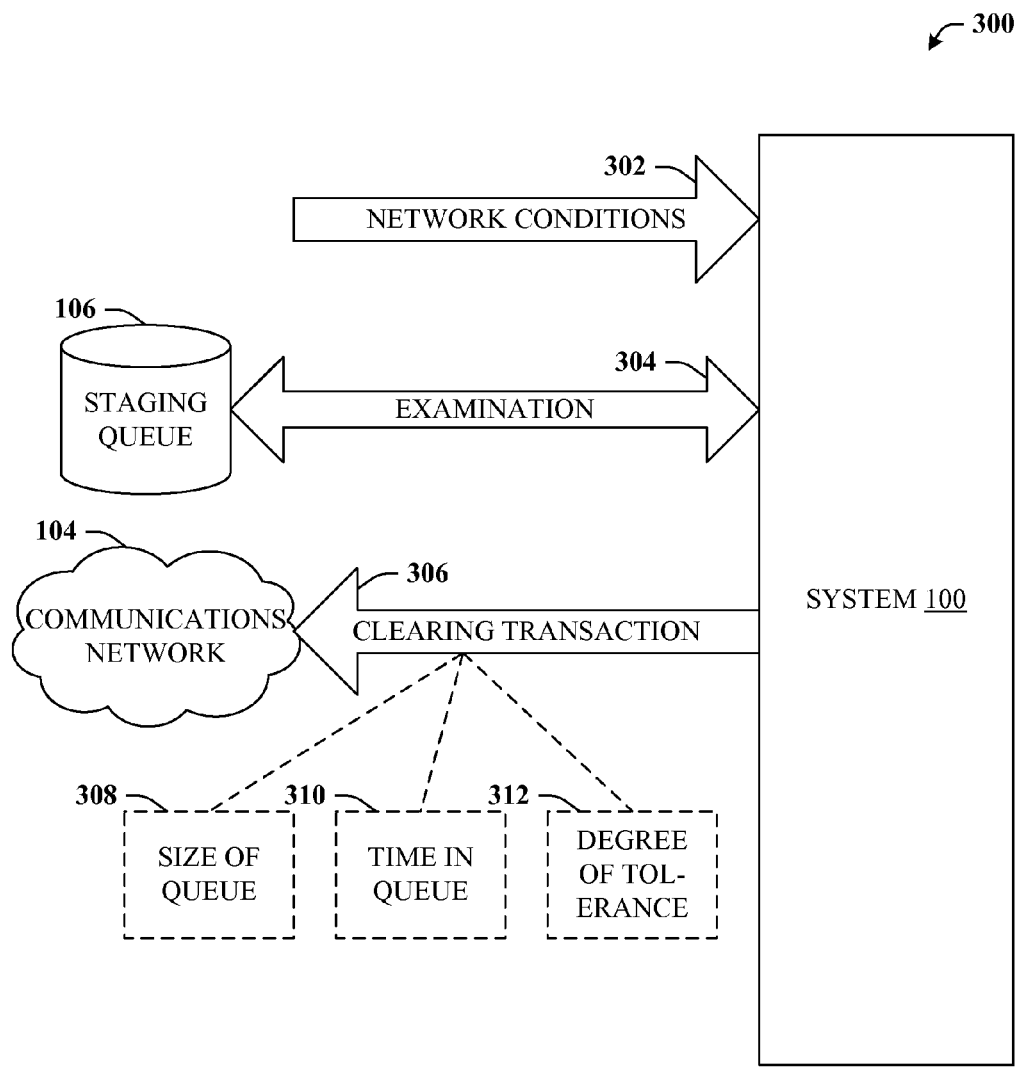
FIG. 3 provides a block diagram of an example system for clearing data out of staging queue.

Referring now to FIG. 3, system 300 is provided. System 300 relates to clearing data out of staging queue 106. As detailed previously, information stored in staging queue 106 can be processed at advantageous times, such as during inactive periods, e.g., during the tail and/or the idle time-out period of other communication transactions. Additionally, in some embodiments, the determination to pull data 102 out of staging queue 106 and transmit that data 102 over the communications network 104 can be further based upon network conditions 302.

For example, during periods of congestions at a given cell or other component of a provider's network, data 102 can remain in staging queue 106 even through an otherwise available idle time-out and/or period of inactivity. Such can apply for data 102 that is staged at the congested cell (or other network component) slated to be sent to a user device or data staged at a user device served by that cell to be delivered to the network. As such, periods of congestion associated with the cell, which are typically relatively transitory, can be alleviated or mitigated by the disclosed subject matter.

In some embodiments, system 100 can be configured to perform an examination 304 of staging queue 106. For instance, consider the case in which a substantial amount of data 102 is stored in the staging queue 106, awaiting transmission, such as in the event that no interactive events have occurred in some time. In such cases, system 100 can issue a clearing communication transaction 306 to clear data 102 from staging queue 106 and transmit by way of communication network 104.

Clearing communication transactions 306 can also be based upon network conditions 302, such as during times of relatively low congestion at a serving cell. Clearing communication transaction 306 can be initiated based upon a variety of other factors. Clearing communication transaction 306 can be initiated based upon a size 308 and/or amount of data included in staging queue 106. For example, if the amount of data included in staging queue 106 surpasses a predefined threshold, then clearing communication transaction 306 can be initiated. In other examples, clearing communication transaction 306 can be initiated based upon an amount of time 310 all or a portion of data 102 has been in staging queue 106. For instance, if data 102 remains in staging queue 106 beyond a predetermined time threshold, such data can be cleared by way of clearing communication transaction 306. Additionally or alternatively, clearing communication transaction 306 can be invoked based upon a degree of delay-tolerance 312 associated with all or portions of data 102 included in staging queue 106. Depending upon the classification of data 102 in terms of delay-tolerance, some portions of data 102 might be slated for clearing before other portions of data 102, which can also leverage clearing communication transaction 306.

Figure 4:
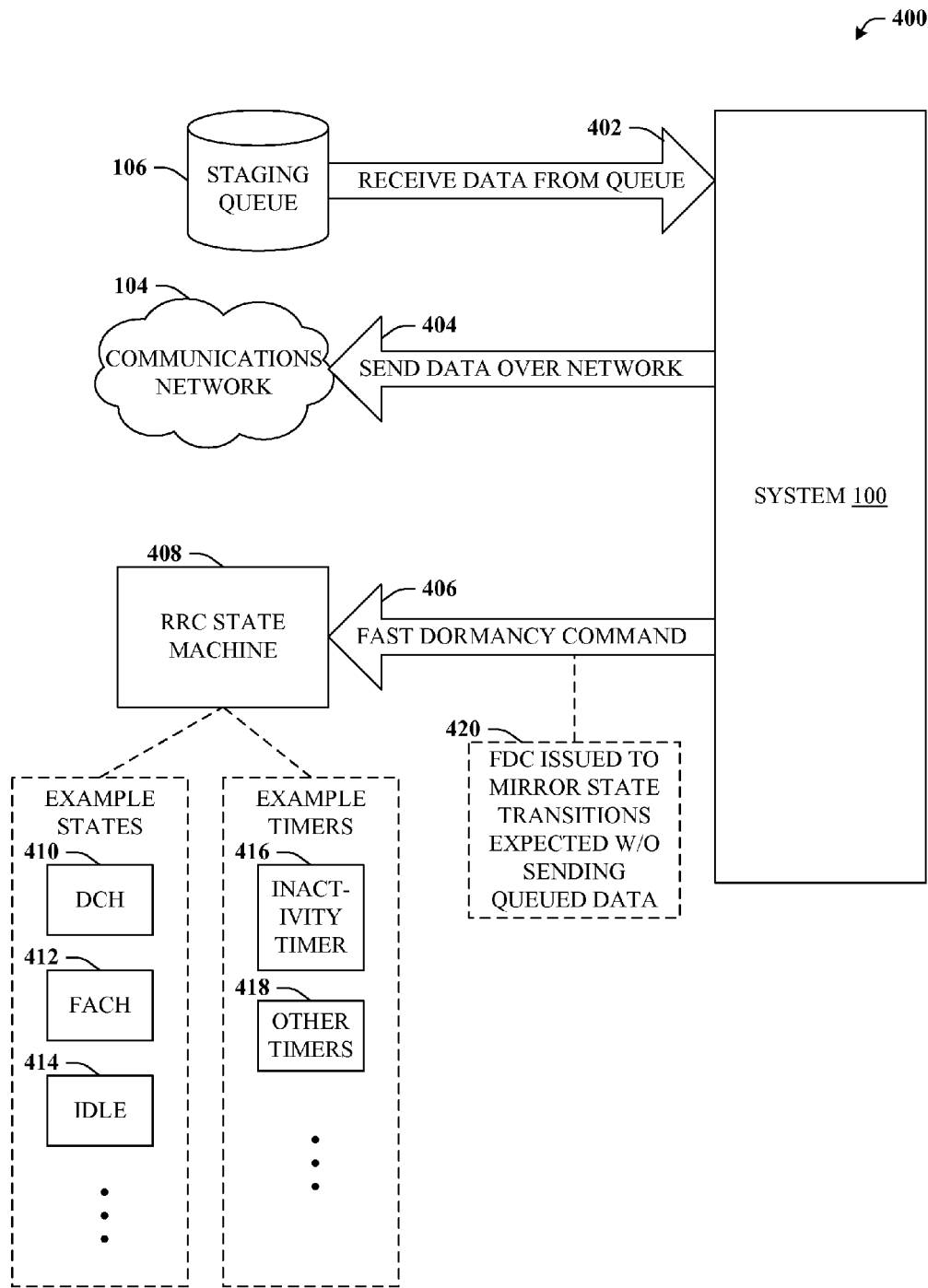
FIG. 4 illustrates a block diagram of an example system that can employ a fast dormancy command to simulate state transitions that would be expected had data included in the staging queue not been transmitted.

With reference now to FIG. 4, system 400 is provided. System 400 illustrates use of a fast dormancy command that can be employed to simulate state transitions that would be expected had data included in the staging queue not been transmitted. For example, in conventional systems, when data is to be exchanged between a service provider's network and user devices, the radio of a user device is powered up to a high-powered state (e.g., dedicated transport channel (DCH) 410). Once in this high-powered state, an inactivity timer 416 starts after the last packet of information is exchanged. Most existing providers require that this inactivity timer 416 expire without any further data being exchanged. Otherwise, if data is exchanged while inactivity timer 416 is counting, the timer 416 is reset. It is understood that a radio resource control (RRC) state machine 408 can include other timers 418 as well.

However, given that the disclosed subject matter can advantageously make use of this inactive period by receiving data from staging queue 106 (reference numeral 402) and intentionally sending that delay-tolerant data over communications network 104 (reference numeral 404) in connection with a different communication transaction, e.g., while inactivity timer 416 is counting, it can be beneficial to ensure that such delay-tolerant traffic does not otherwise extend the idle time-out period. Such can be achieved by employing fast dormancy command 406. Fast dormancy command 406 can be issued to RRC state machine 408 to force the radio of a user device to transition to a lower powered state (e.g., fast access transport channel (FACH) 412), after which the radio will then customarily power down to an IDLE state 414. Given that the transmission of delay-tolerant traffic during the tail or other inactive periods will likely cause associated inactivity timers to reset, use of fast dormancy command 406 can cause state transitions to occur as though no delay-tolerant data was transmitted at all. Hence, fast dormancy command 406 can be issued to RRC state machine 408 after all delay-tolerant traffic has been transmitted, or issued after a certain amount of delay-tolerant traffic has been transmitted, whether or not queue 106 still includes delay-tolerant data. Thus, state transitions that occur when sending delay-tolerant data can be managed to simulate the same states that would otherwise be expected had no delay-tolerant data been sent, as indicated by reference numeral 420. Additional details are provided in connection with FIG. 5.

Figure 5:
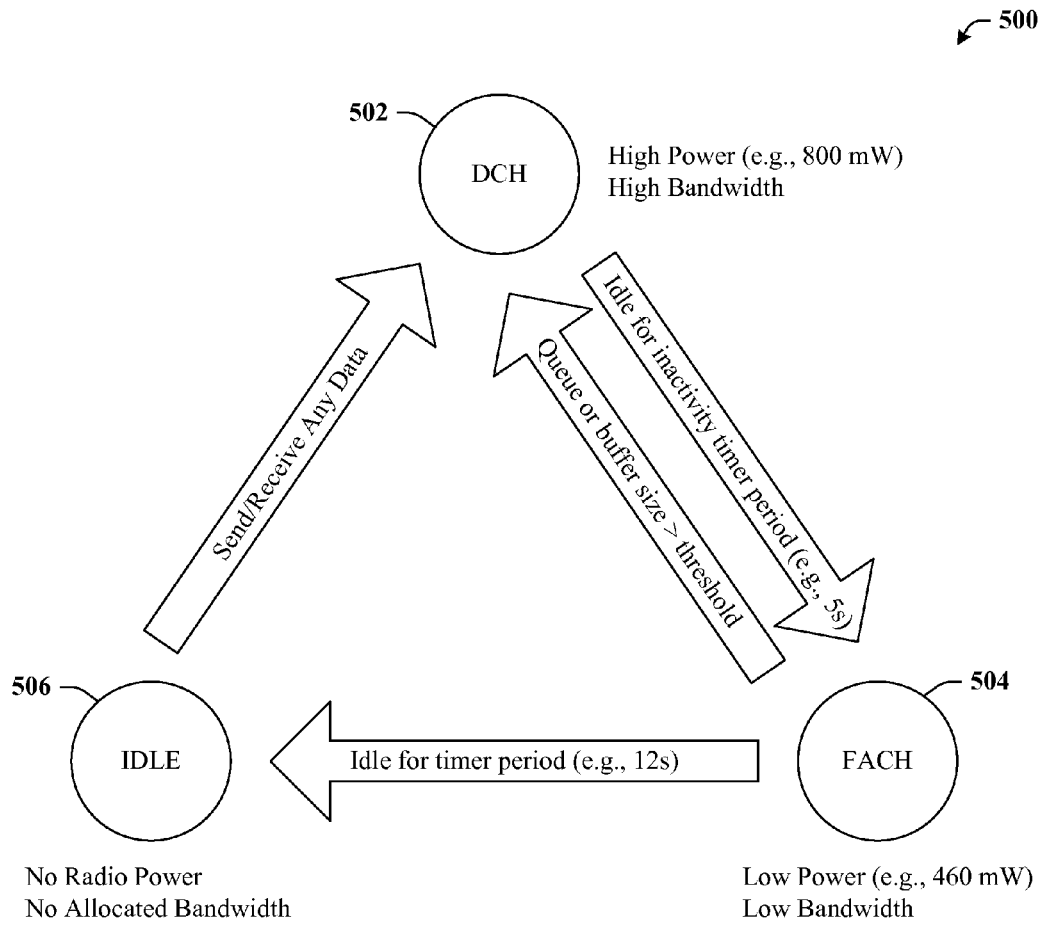
FIG. 5 depicts an example state diagram associated with a radio resource control state machine.

Turning now to FIG. 5, illustration 500 is provided. Illustration 500 depicts an example state diagram associated with a radio resource control state machine. The states provided in this example can be common to conventional wireless carriers and/or service providers, and thus leveraged to implement the disclosed subject matter in conventional architectures. In this example, RRC state machine can manage three distinct states associated with a radio of a user device. The DCH state 502 is associated with a high-powered state, which can be reached from either the FACH state 504 (e.g., a low-powered state) or the IDLE state 506.

These states and associated RRC state machine can facilitate management of resource allocation in connection with today's service providers such as energy use and network signaling. It is understood that in the remainder of the examples, Universal Mobile Telecommunications System (UMTS) networks are assumed. Although the focus is on the most widely used Third Generation (3G) technology, the basic principles remain the same for related technologies such as Long-Term Evolution (LTE).

UMTS mobile devices establish network connectivity through a UMTS Terrestrial Radio Access Network (UTRAN) consisting of base stations (or Node-Bs) and Radio Network Controllers (RNCs). Each RNC handles a number of base stations and is responsible for controlling network resources. The RNC allocates these resources using per-device RRC state machines whose transitions are triggered by device traffic exchanges and carrier-determined inactivity timers. For example, the state machine associated with illustration 500 for a conventional carrier can include additional parameters summarized in Table I.

TABLE I

| TRANSITION | | TIMING |
|---|---|---|
| FACH → IDLE | | 12 s |
| DCH → FACH | | 5 s |
| FACH | Threshold UL | 540 |
| RLC | Drain UL | $0.0014t^2 + 1.6t + 20$ ms |
| Buffer | Threshold DL | 475 |
| (bytes) | Drain DL | $0.1t + 10$ ms |
| IDLE → DCH signaling | | $2.0 \pm 1.0$ s |
| FACH → DCH signaling | | $1.5 \pm .05$ s |

This state machine has an IDLE state 506, in which the mobile device consumes no energy on its radio, and no network resources. Upon network use, the mobile device is promoted into a high-bandwidth, high energy consumption DCH state 502, in which it is allocated a "dedicated" channel by the network. Typical signaling latency for moving to the DCH state 502 is two seconds, while devices consume between 570 mW to 800 mW in this state. After a few seconds of inactivity, the user device is demoted to a shared channel, FACH state 504, in the hopes of satisfying marginal network use with a low-bandwidth shared channel, and lower energy usage (450-460 mW in average). Eventually, after a second threshold of inactivity, the mobile is downgraded from FACH back to the IDLE state. If, on the other hand, the mobile networking activity overflows a buffer (in the Radio Link Control layer or RLC), it is promoted again to the DCH state.

Thus, each state of the RRC state machine dictates device's energy consumption and the network channels it can use. Transitions between low-power states to high-power states are triggered by network activity, whereas transitions between high-power states to low-power states are triggered by inactivity timers. The inactivity timers are necessary to preclude spurious state transitions, which add extra delays and impose non-trivial network signaling overheads. The inactivity timers are tuned by network engineers to provide a healthy dose of hysteresis. There are as many variations on this state machine as there are carriers—with different states, different transitions, and different thresholds for triggering them. But two key elements, staged resource acquisition and hysteresis via inactivity timers, remain across all variations.

With high-speed packet access (HSPA), the latest revision to UMTS, channel capacity can be allocated at a finer granularity within the DCH state. Channel scheduling of devices in the DCH state, both up and downlink, is performed by RNCs with a granularity of 10 ms or 2 ms. Thus, once in DCH, devices use as many 10 ms/2 ms scheduling periods as their traffic demands, with little spectrum wastage. However, the state machine still remains important because it determines the energy state of the mobile device modem/radio, and the signaling caused by transitions still places non-trivial demands on the network's control plane.

Hence, the disclosed backfilling can be employed as a new traffic scheduling technique that reuses unutilized gaps between bursts of traffic from interactive applications to send delay tolerant traffic. The operating system (OS) of a user device tracks RRC state machine transitions that result from interactive traffic alone, and transmits backfill traffic during periods of inactivity within the DCH state. Such unused DCH periods exist because of the hysteresis imposed by the RRC state machine inactivity timers, an example of which can be found with reference to FIG. 6A.

Figure 6A:
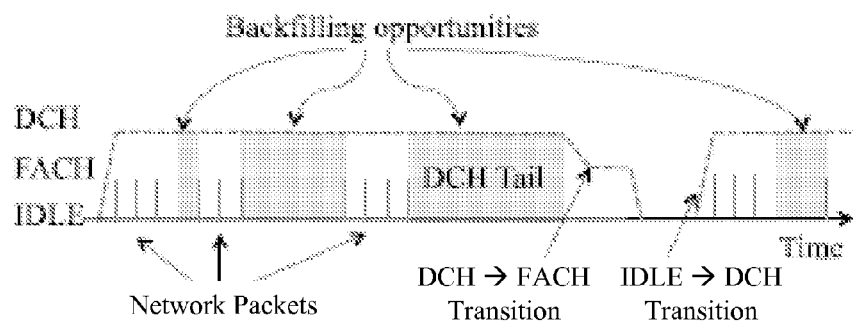
FIG. 6A provides an example timing diagram that can be employed in connection with backfilling.

FIG. 6A depicts illustration 600. Illustration 600 provides an example timing diagram that can be employed in connection with backfilling. As depicted, backfilling opportunities can exist both between short gaps in bursty traffic, and during the whole duration of the "DCH tail," before the user device down-transitions to the FACH state. By using such gaps profitably, the device can exchange large amounts of additional data with little additional energy usage and signaling load.

To potentially achieve the lowest incremental cost, backfilling can be configured to closely track the state machine transitions that would have occurred with interactive traffic only. Backfill traffic can therefore be ignored when computing the state machine trigger conditions summarized in Table I. Although the state machine is maintained within the RNC, the trigger conditions we need can also be controlled, indirectly, entirely from the device itself through the use of fast dormancy (e.g., fast dormancy command 406). Fast dormancy is a mechanism to allow devices to signal an immediate DCH to the IDLE transition to the RNC. Thus, when the OS detects that the RRC state machine would have down-transitioned if backfill traffic were absent, the OS can initiate fast dormancy to transition to the IDLE state, thus emulating the state machine's behavior in absence of backfill traffic.

Improper use of fast dormancy can substantially increase the frequency of RRC state changes, and overload the network control plane by increasing signaling load. Therefore, network carriers often work with vendors to disable or significantly restrict the use of fast dormancy. Preliminary investigation shows that none of the UMTS USB dongles available for a major US carrier had a fast dormancy API that was exposed to the OS; however, an undocumented AT command was discovered for Infineon chipsets. Unlike tail optimization approaches that advocate shortening of DCH tails, the disclosed approach is compatible with such carrier restrictions on fast dormancy since such can be used to preserve the original state-machine transitions.

The resulting delay-tolerant backfill service is an "eventually complete" best-effort service that, at the OS or network provider's discretion, can make arbitrary progress in reliably transmitting a stream of bytes to the receiver. Progress is not guaranteed—for instance, with the proper network support, the network can ask to delay transmission of backfill traffic in periods of network congestion. Conversely, the OS may batch and efficiently send a large chunk of backfill traffic even in the absence of any interactive traffic (e.g., clearing communication transaction 306). In return for the flexibility provided in handling network congestion, network providers may choose to provide economic incentives for backfill data either by charging lower per-byte rates, or by counting only a fraction of the transfer towards a user's data cap.

Thus, an additional advantage of backfilling can be the simplicity of the application programming interface (API) exposed by the OS. At its core, the backfilling API can allow applications to discriminate between interactive and delay-tolerant traffic. For the sake of thoroughness, an example API, and successive extensions for finer grained control is provided. Without loss of generality, the example API leverages Linux.

The traditional method for establishing network connections is the socket interface, which allows for fine-grained control via the setsockopt family of system calls. An initial setsockopt can be used by applications to tag sockets as transmitting delay-tolerant traffic. An application can move the connection out of delay-tolerant queues through an explicit flag setting, or as a side-effect of other socket control settings such as disabling Nagle's algorithm. Reads, writes, and completion status queries of a transfer can be supported via the aio family of asynchronous I/O calls (e.g., aio_read, aio_write, and aio_error).

Delaying outbound traffic within the OS for backfilling can be relatively simple. Handling inbound traffic can be slightly more involved because such can require the remote sender to pause the network flow when there are no opportunities for backfilling. For short durations, such can be accomplished without cooperation from the sender by using the TCP persist condition. Specifically, the mobile OS can "stall" (and resume) a TCP flow by advertising a zero (or non-zero) length TCP receiver window. Since the mobile device is then unreachable when the flows are stalled, network support for responding to sender probe packets for stalled flows may be required. While all TCP implementations are required to support zero-sized windows, firewalls or applications can sometimes terminate long-lived stalled connections to reclaim resources. In such situations or UDP flows, more extensive network staging of inbound flows may be needed.

Unbounded wait is generally not desirable for delay-tolerant traffic. Most delay-tolerant traffic expects to be transmitted "soon" as opposed to "right now", and perhaps an equally accurate term would be "non-urgent" traffic. Two bounds to trigger transmission of the accumulated delay-tolerant traffic can be (1) wait time and (2) bytes accumulated. The former can trigger transmission if the oldest packet has waited for more than N seconds, where N can be a predetermined value; the latter can transmit once the byte count exceeds a B threshold, where B can be a predetermined value. Bounds can also cause the same traffic aggregation effect sought by application modification techniques, and the "taps" and "preserves" primitives of, e.g., Cinder. Bounds can be applied globally, through /proc keys, or on a per-socket basis.

While much of the previous disclosure relates to application-centric features, other features can be discussed. For example, the OS can readily detect periods of active resource reservation without any pending traffic to duty-cycle. A callback mechanism allows the OS to signal to applications this transient opportunity to push further payloads on a backfilling window. The select family of system calls provides a good conduit. For example, this family can allow applications to (i) decide when to wait, (ii) aggregate multiple events in a single wait point, and (iii) read from the OS, via a pipe, additional information, such as the size of the current backfilling window.

Example Applications

On top of the OS interface, a toolkit can expose multiple user-space primitives to simplify application interaction with the backfilling machinery. Applications can set up staging areas for outbound payloads; these applications can set up a publish-subscribe mechanism to be alerted of arrival of messages. Or, more generally, the publish-subscribe mechanisms can be structured as event-driven loops with callbacks reacting to backfilling activity. While existing applications can benefit from transferring "subsidized" delay-tolerant data, backfilling can also enable wider use of applications that users may be reluctant to run otherwise. Below, four applications are outlined along with the primitives those applications can leverage:

Participatory Sensing:

The plethora of sensors (GPS, accelerometer, camera, etc.) on contemporary smart phones has resulted in the birth of participatory sensing applications, in which phones upload sensor readings to data-mining repositories. Such uploads can use a staging area to aggregate data until a backfilling opportunity arises.

Backup and Synchronization:

With backfilling, backup can be performed opportunistically and at a possibly lower price. This is a classical example of an event-driven application, triggering backup cycles upon availability of backfilling windows.

Email and RSS:

Periodic email and RSS polling represent characteristic examples of delay-tolerant traffic that can be optimized for 3G networks, through the use of staging areas (for outbound email) and publish-subscribe pools (for inbound RSS and email).

Cloud Offload:

Recent proposals have recommended offloading security checking to cloud services, at a high data transmission cost. Backfilling can turn such services into event-driven loops and lower or eliminate transmission costs. The amount of tolerable delay for security responses can be easily tuned through the API.

Figure 6B:
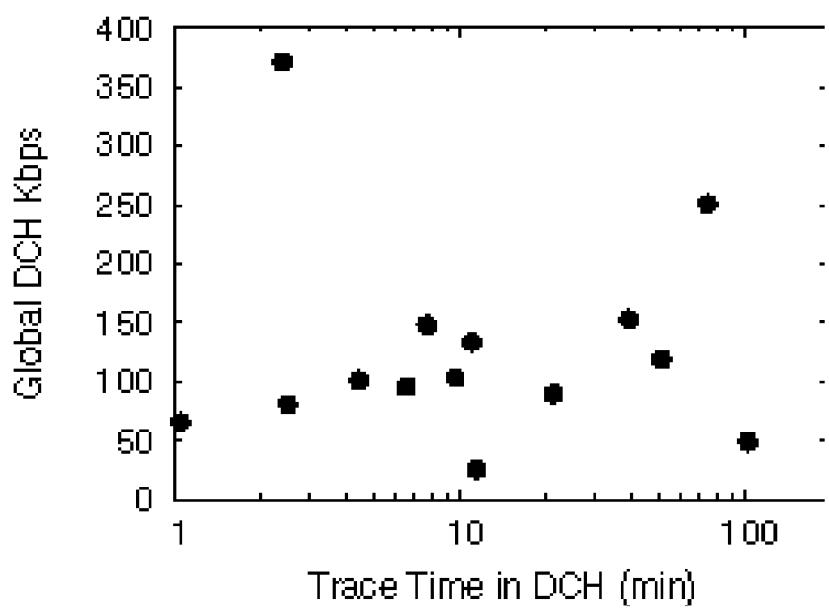
FIG. 6B provides an example plot of dedicated transport channel utilization vs. dedicated transport channel DCH for traces of varying duration.

It is appreciated that additional support for backfilling can be provided by measuring the size of the opportunity, which can be accomplished in two phases. First, focus can be placed on device-centric measurements, and then later extend the study to incorporate network-wide metrics Example Device-Centric Measurements Referring now to FIG. 6B, illustration 610 is provided. Illustration 610 depicts a graphical plot of DCH utilization vs. DCH time for traces of varying duration. In the instant case, fifteen traces of UMTS networking traffic were harvested. The harvesting devices were a Windows 7 laptop with an Infineon-based LG Adrenaline data card, a Macbook Air laptop with an Option data card, and an Android-based Samsung Captivate phone with an Infineon built-in modem. All modems were HSPA+ capable. In each case, these devices already had an owner with established usage patterns. Thus, the test simply turned on tracing, disabled WIFI and Ethernet to ensure the UMTS network was used, and let the user continue as usual. The durations of the traces were randomly distributed between as little as five minutes, to over an hour (77 minutes), to three full-day traces (around 1420 minutes).

Libpcap-based utilities (e.g., tcpdump, wireshark, etc.) were used to harvest the data traces. Because libpcap presents packets as seen by the OS, HSPA-level MAC headers and retransmissions were not captured. The traces were then input to an emulated UMTS radio resource state machine, following the parameters of FIG. 5 and Table I. Such enabled the calculation, assuming the traffic had occurred in a hypothetical "Carrier 1" network, the time spent by the network devices in DCH and FACH modes, as well as the bytes transmitted in each case.

The numbers obtained are consistent with measurements in the literature. DCH tail times hover around 20%. Backfilling opportunities are not limited to DCH tails—any significant gap in network use during a DCH state can be used. For example, one of the traces corresponds to roughly 75 minutes of watching a Hulu video. The UDP traffic from Hulu peers prevents the modem from ever leaving the DCH state. Yet, packet inter-arrival times of two seconds were not uncommon. Thus, in some cases, even streaming downloads can benefit by backfilling, such as designated certain packets of the download as delay-tolerant.

As noted, illustration 610 provides a plot of the traces, sorted by the amount of time spent in DCH state, against the global DCH bitrate in Kbps (e.g., bits sent and received in DCH, divided by DCH time). It is underscored that rarely does a trace exceed 150 Kbps of global DCH bitrate. Rather, most traces accumulate longer than 10 minutes of DCH time, with a trace showing as little as 25 Kbps over 11 minutes. Clearly, the opportunity for backfilling while spending marginal additional energy is present, even for nominal channel capacity as low as 384 Kbps, which was already achievable a decade ago. At that capacity, most of the traces could push over 20 MiBs of backfill traffic.

Example Network-Centric Measurements

To complement the view from the device perspective, various network traces can now be examined. Results from an example UMTS provider in a major urban area are examined. The data feed obtained is decomposed by RNC, by Node-B within each RNC, and by mobile within each cell, totaling 1,853 Node-Bs and 130,653 mobile users. The data for the mobile devices consist of the number of kilobits sent and received for every second for which that device was DCH activity (e.g., the data demand). For abstraction, all numbers are expressed as ratios and/or percentages.

Figure 7A:
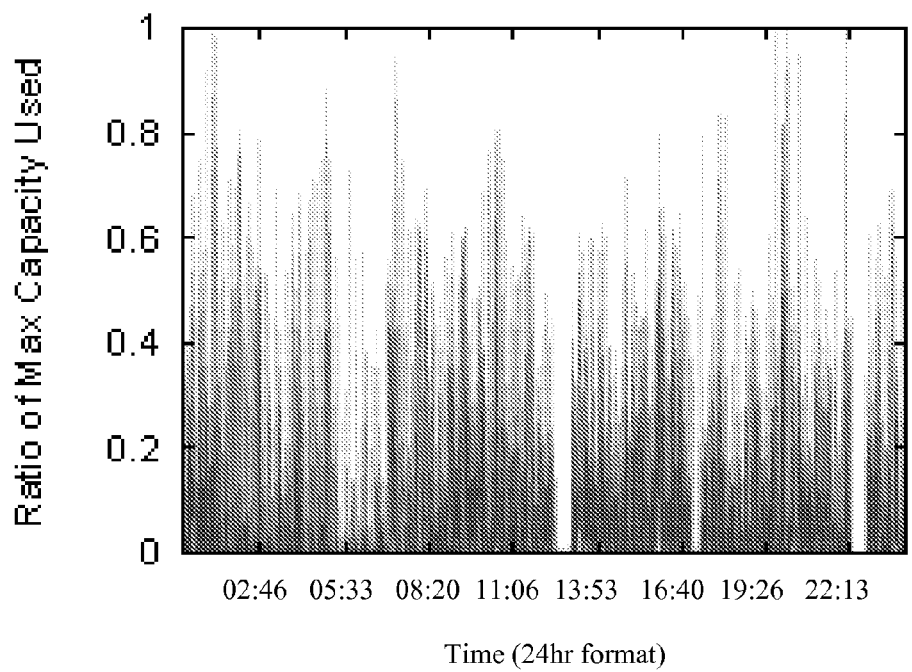
FIG. 7A provides an example plot of the demand per second over a full day expressed as a ratio of the peak.
Figure 7B:
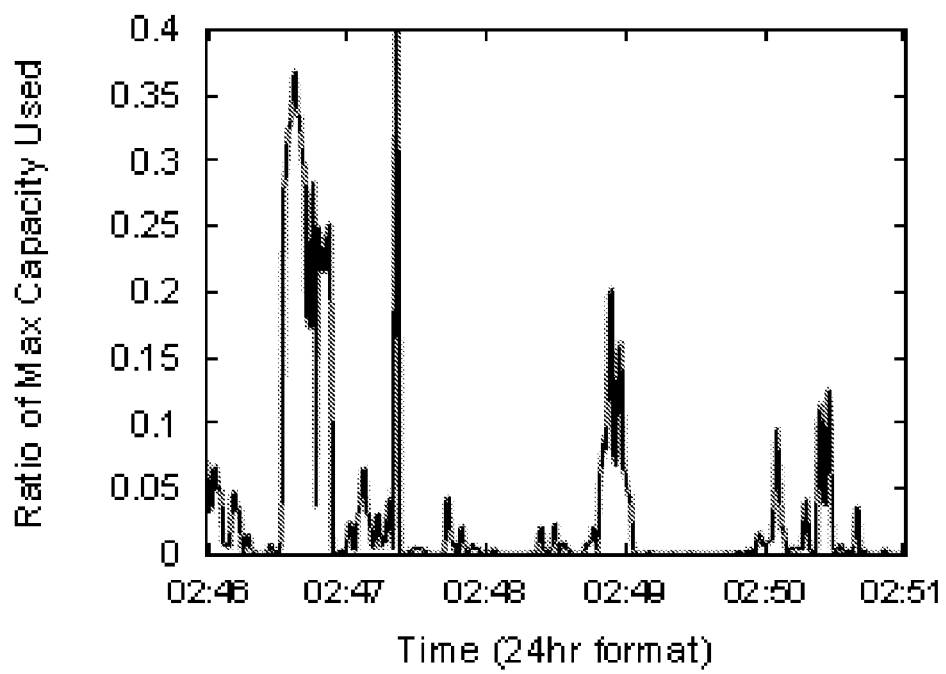
FIG. 7B provides an example plot of the demand per second over a selected five-minute interval from the full day.

In FIG. 7A, a plot of the demand per second over the full day is expressed as a ratio of the peak. In FIG. 7A, a particular cell that experienced a high degree of activity has been selected for closer examination. The peak can be seen to have occurred at about 7:42 pm. It is noted that high short-term variance in demand can reveal a substantial opportunity for backfilling. FIG. 7B plots the demand per second over a selected five-minute interval. FIG. 7B zooms into a five-minute period (starting at 10 thousand seconds) of FIG. 7A to reveal the abundance of short-term valleys of low utilization.

Feeding the data harvested for individual mobile devices to a state machine emulator gives a finer-grained picture. For each mobile and each DCH period, spare capacity that can be reused for backfilling can be calculated. The individual peak bitrate actually achieved by each mobile device in each DCH period is used as a proxy for the maximum achievable bitrate. Such is a conservative estimate, and therefore the estimates of the backfilling opportunities disclosed can be viewed as conservative.

Figure 8A:
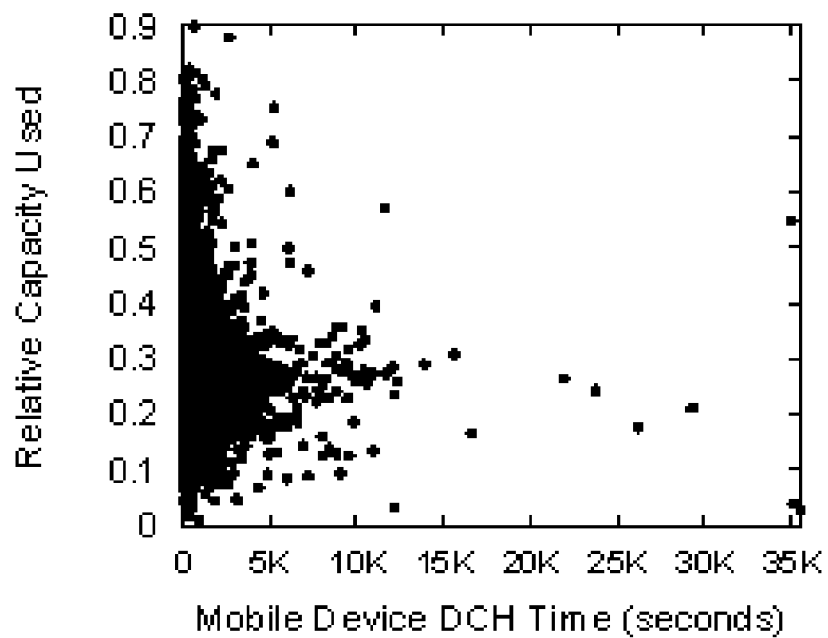
FIG. 8A provides an example plot of the ratio of the used capacity to total capacity for the dedicated transport channel periods of the user devices.

FIG. 8A plots the ratio of the used capacity to total capacity for each DCH period of each mobile device. The relative capacity utilized is largely independent of the length of the DCH periods, and clusters heavily around 25%. In other words, for most devices and most time periods, three additional bytes could have been backfilled for each byte transmitted over UMTS, at marginal additional energy cost for the device.

Figure 8B:
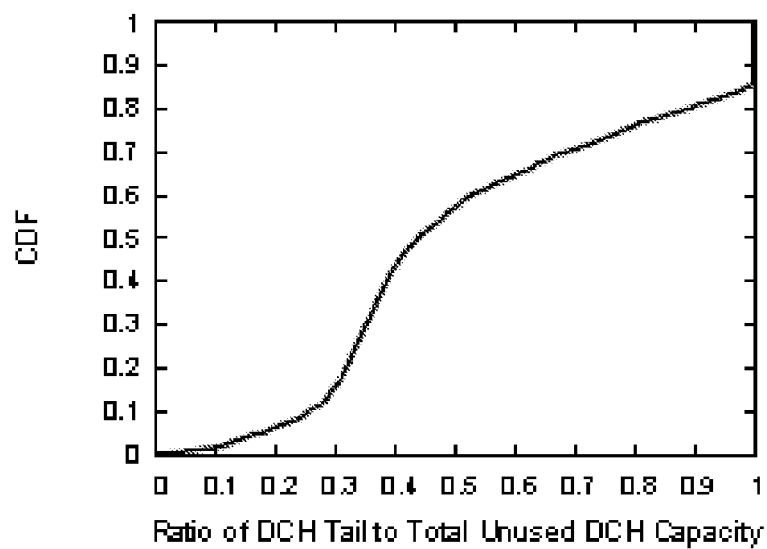
FIG. 8B provides an example graph of a cumulative distribution function of the ratio of the unused dedicated transport channel capacity represented by dedicated transport channel tails.

FIG. 8B illustrates a cumulative distribution function (CDF) of the ratio of the unused DCH capacity represented by DCH tails. The plot shows that over half the opportunities for backfilling lie beyond the DCH tails, with unused capacity available in the "spaces in between" in a transmission stream. The median ratio represented by DCH tails is slightly over 40% of the unused DCH capacity. The CDF shows that for roughly 15% of the DCH periods, the DCH tail represents all unused capacity. For such instances, the period of active DCH use is the minimum quantum recorded by the tracing discussed above, thus representing isolated single-shot bursts of networking activity.

Hence, it is readily apparent that the disclosed traffic backfilling can be employed as a means of allowing applications to optimize their interactions with wireless cellular networks. With backfilling, delay-tolerant traffic can be transmitted leveraging the unused resources left over by bursts of interactive and urgent foreground application traffic. Through device traces and network data from a major US carrier, it has been illustrated that there are ample opportunities for traffic backfilling today in existing frameworks, which can be leveraged at a marginal cost both from a network signaling and device energy standpoint.

Figure 9A:
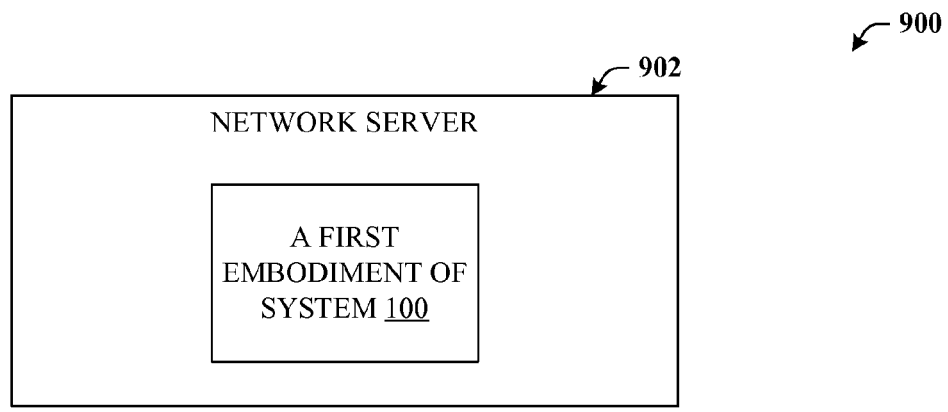
FIGS. 9A-B provide block diagrams of systems in which various design and/or implementation configurations are depicted.
Figure 9B:
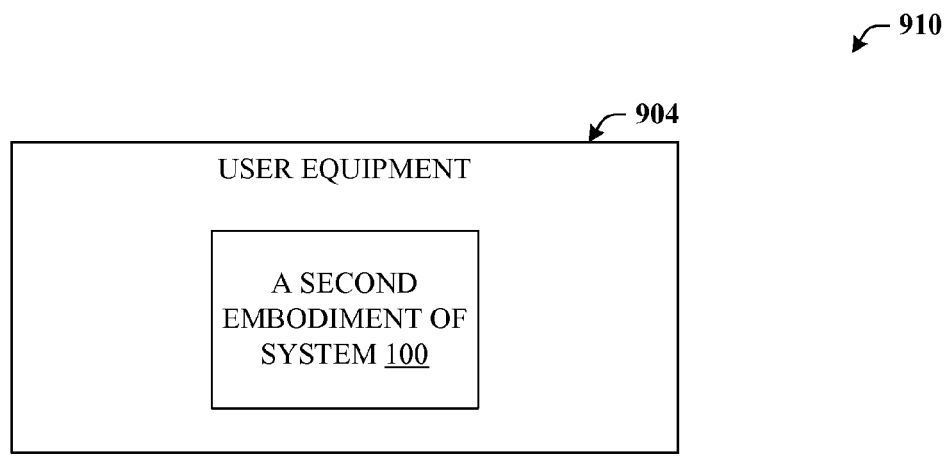

With reference now to FIGS. 9A-B, various design and/or implementation configurations are depicted. In particular, FIG. 9A relates to system 900 that can be configured such that all or a portion of system 100 can be included in network server 902, such as a nodeB or other suitable network component. Likewise, FIG. 9B relates to system 910 in which all or a portion of system 100 can be included in user equipment 904 such as a mobile phone or another suitable mobile device.

It is understood that components described herein associated with system 100 can exist as combinations of both hardware or software. For example, system 100 can be embodied in whole or in part as hardware devices or as instructions executable by a processor and stored in a non-transitory computer readable medium.

Figure 10:
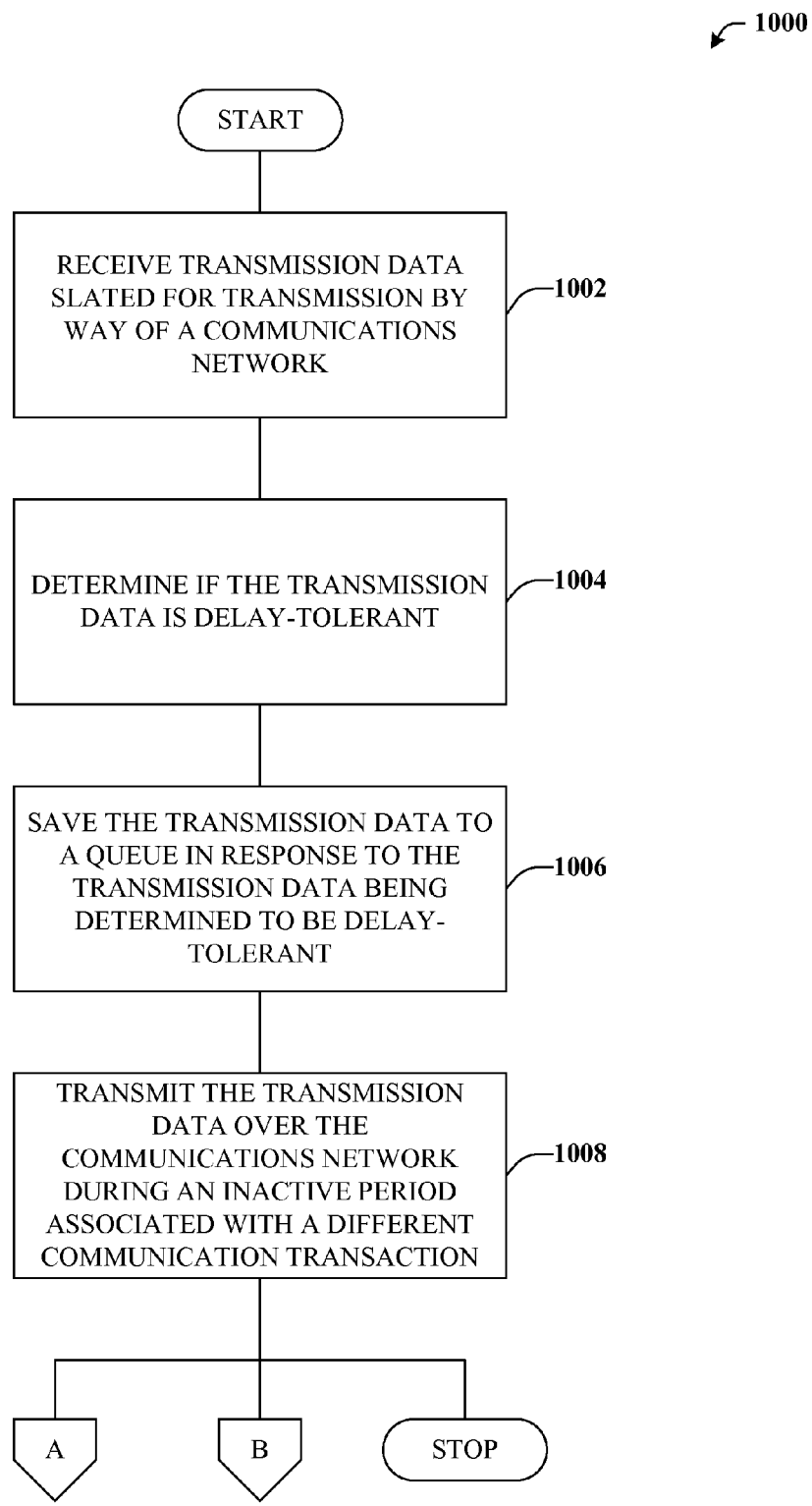
FIG. 10 depicts an exemplary flow chart of procedures defining a method for opportunistically leveraging existing periods of inactivity for sending data at virtually no marginal cost in terms of resource utilization.
Figure 11:
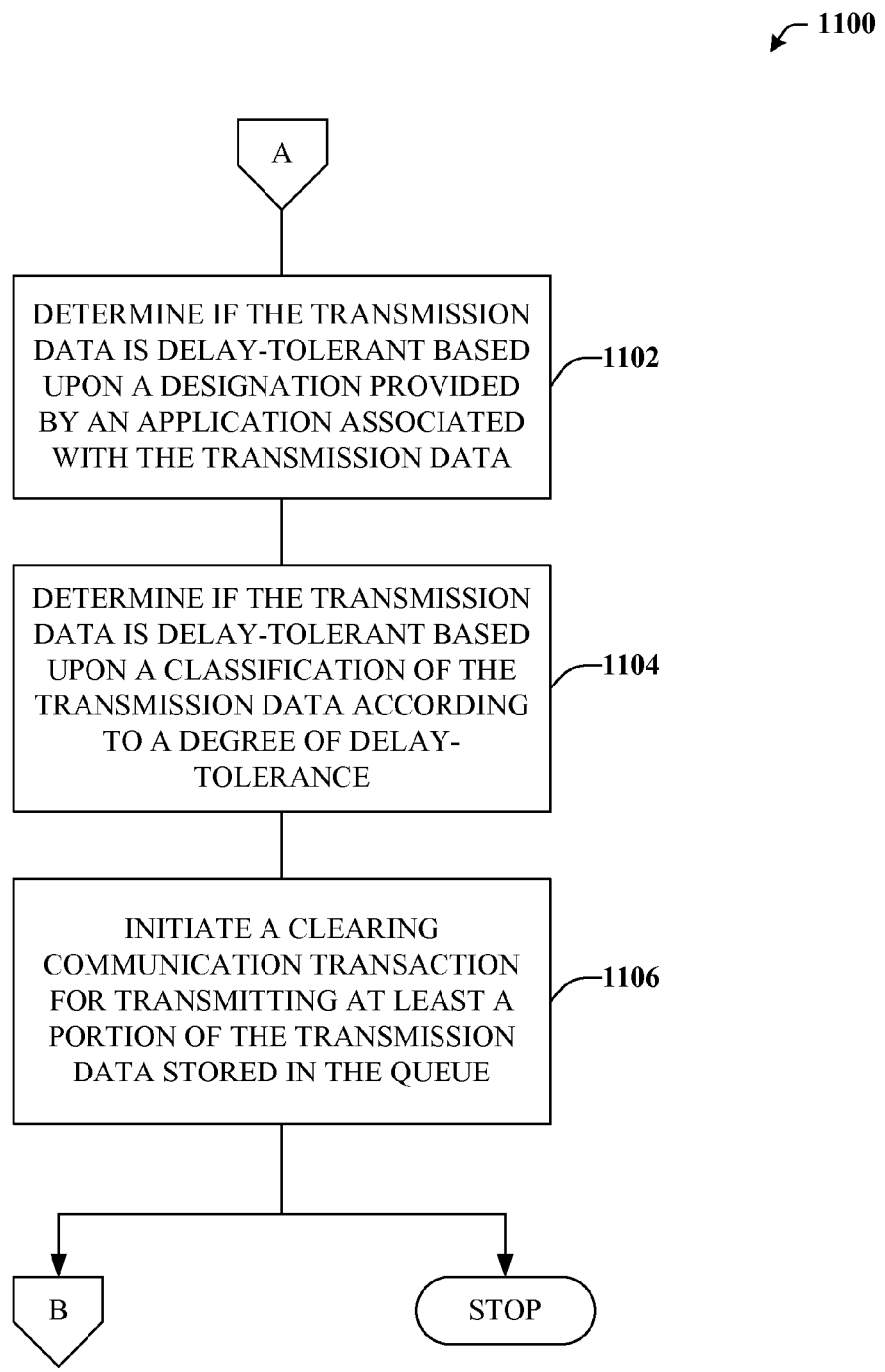
FIG. 11 depicts an exemplary flow chart of procedures defining a method for providing additional features or aspects in connection with opportunistically leveraging existing periods of inactivity.
Figure 12:
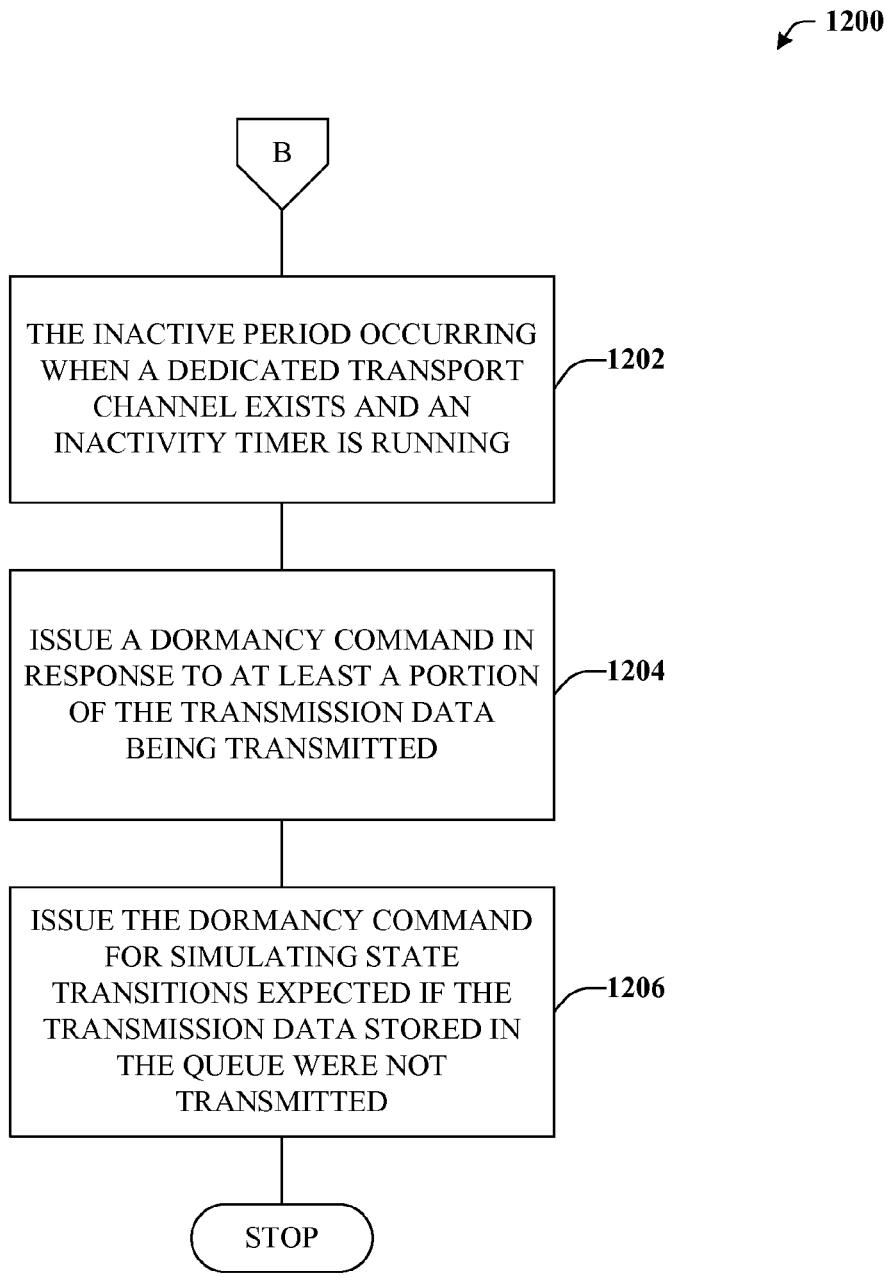
FIG. 12 is an exemplary flow chart of procedures that define a method for providing additional features or aspects in connection with existing periods of inactivity.

FIGS. 10-12 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 10, exemplary method 1000 for opportunistically leveraging existing periods of inactivity for sending data at virtually no marginal cost in terms of resource utilization is depicted. Generally, at reference numeral 1002, transmission data slated for transmission by way of a communications network can be received.

However, rather than immediately conveying the transmission data to the communications network, at reference numeral 1004, a determination can be made as to whether or not the transmission data is delay-tolerant. If not, then the transmission data can be processed as would normally occur.

On the other hand, if the transmission data is determined to be delay-tolerant, then at reference numeral 1006, the transmission data can be saved to a queue. The transmission data can remain in the queue for a period of time that can be determined based upon a variety of factors.

At reference numeral 1008, the transmission data can be transmitted over the communications network during an inactive period associated with a different communication transaction. For example, during periods of inactivity or activity in which throughput is not maximized, which can be at the tail of the different communication transaction or during other periods of that transaction.

Turning now to FIG. 11, exemplary method 1100 for providing additional features or aspects in connection with opportunistically leveraging existing periods of inactivity is illustrated. At reference numeral 1102, the determination of whether or not the transmission data is delay-tolerant (e.g., reference numeral 1004 of FIG. 10) can be determined based upon a designation provided by an application associated with the transmission data. For example, the application responsible for issuing the data or otherwise managing the transmission of that data can select whether or not any given data is designated as interactive or delay-tolerant (potentially to varying degrees of delay-tolerance in some embodiments). Additionally or alternatively, at reference numeral 1104, the determination of whether or not the transmission data is delay-tolerant can be determined based upon a classification of the transmission data that can be performed on-the-fly and can be based upon an analysis of the degree of delay-tolerance associated with particular transmission data.

It is understood that the situation might arise in which staging queues housing transmission data for eventual transmittal can accumulate over time based upon usage, network conditions, or the like. Thus, at reference numeral 1106, a clearing communication transaction can be initiated. The clearing communication transaction can be employed for transmitting at least a portion of the transmission data store in the queue. The clearing transaction can be initiated based upon a variety of factors. For example, based upon a size and/or amount of data in the queue, based upon an amount of time spent in the queue, and/or based upon a degree of delay-tolerance associated with the transmission data in the queue.

Referring now to FIG. 12, exemplary method 1200 for providing additional features or aspects in connection with existing periods of inactivity is illustrated. At reference numeral 1202, the inactive period discussed at reference numeral 1008 of FIG. 10 can occur at specific times, in particular when a dedicated transport channel (DCH) exists and an inactivity timer is running. Such can occur at the tail of the different transaction. Additionally or alternatively, such can occur at any time in which the DCH exists, for instance during periods of low or no activity.

At reference numeral 1204, a fast dormancy command can be issued in response to at least a portion of the transmission data being transmitted. In cases where an inactivity timer is running, the delay-tolerant data in the queue that is transmitted might operate to reset the inactivity timer. Thus, the fast dormancy command can be issued to force a state transition at a determined time.

For example, at reference numeral 1206, the fast dormancy command can be issued for simulating state transitions as expected if the transmission data stored in the queue were not transmitted at all. Hence, transmission data included in the queue can be transmitted without increasing the resource utilization over what would exist if only interactive data were transmitted.

Figure 13:
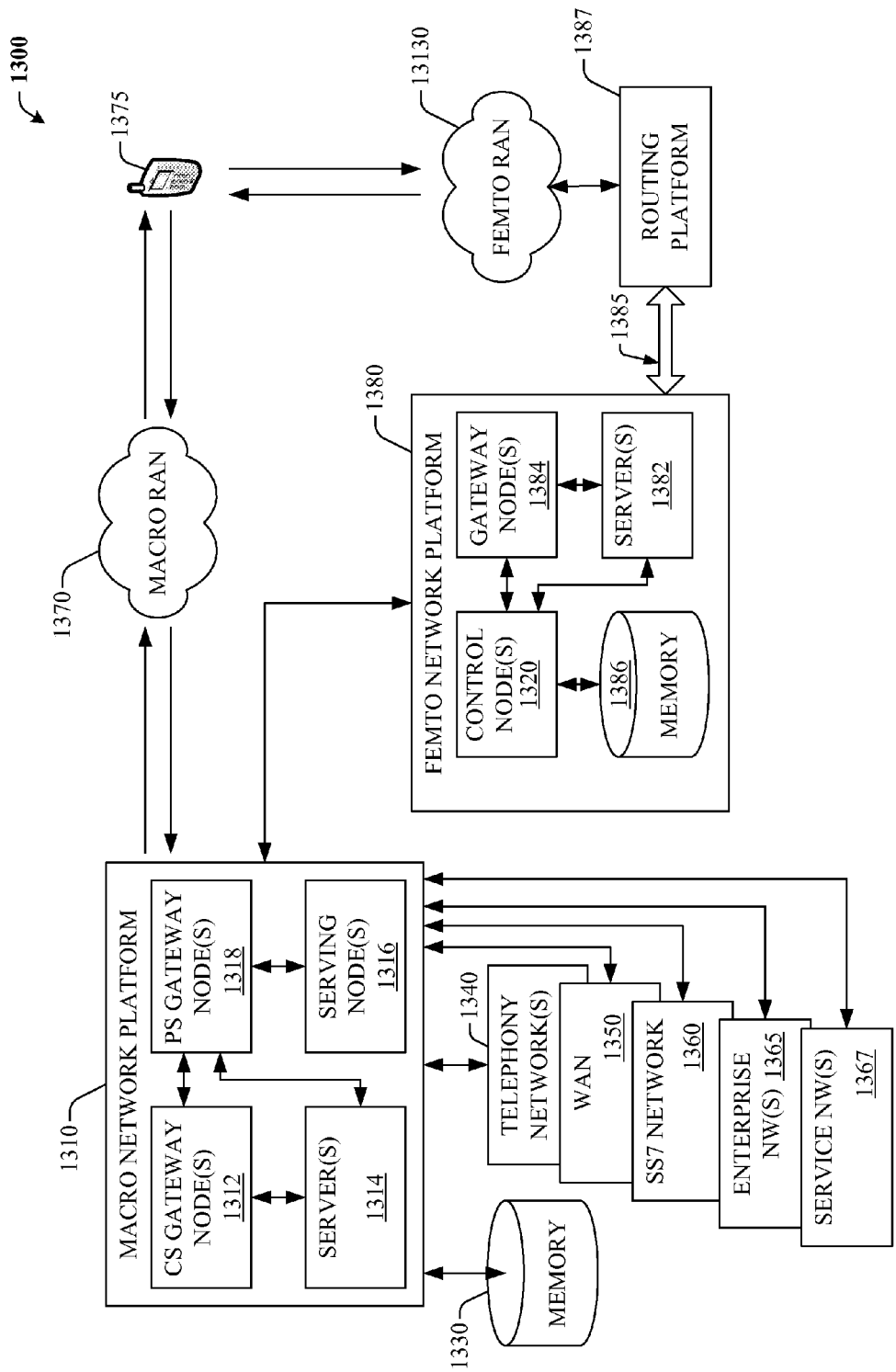
FIG. 13 illustrates a first example of a wireless communications environment with associated components that can be operable to a portion of the disclosed subject matter.

To provide further context for various aspects of the subject specification, FIG. 13 illustrates an example wireless communication environment 1300, with associated components that can enable operation of a femtocell enterprise network in accordance with aspects described herein. Wireless communication environment 1300 includes two wireless network platforms: (i) A macro network platform 1310 that serves, or facilitates communication) with user equipment 1375 via a macro radio access network (RAN) 1370. It should be appreciated that in cellular wireless technologies (e.g., 4G, 3GPP UMTS, HSPA, 3GPP LTE, 3GPP UMB), macro network platform 1310 is embodied in a Core Network. (ii) A femto network platform 1380, which can provide communication with UE 1375 through a femto RAN 1390, linked to the femto network platform 1380 through a routing platform 132 via backhaul pipe(s) 1385, wherein backhaul pipe(s) are substantially the same a backhaul link 3853 below. It should be appreciated that femto network platform 1380 typically offloads UE 1375 from macro network, once UE 1375 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1370 can comprise various coverage cells like cell 1205, while femto RAN 1390 can comprise multiple femto access points. As mentioned above, it is to be appreciated that deployment density in femto RAN 1390 is substantially higher than in macro RAN 1370.

Generally, both macro and femto network platforms 1310 and 1380 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Circuit switched gateway 1312 can authorize and authenticate traffic (e.g., voice) arising from such networks. Additionally, CS gateway 1312 can access mobility, or roaming, data generated through SS7 network 1360; for instance, mobility data stored in a VLR, which can reside in memory 1330. Moreover, CS gateway node(s) 1312 interfaces CS-based traffic and signaling and gateway node(s) 1318. As an example, in a 3GPP UMTS network, gateway node(s) 1318 can be embodied in gateway GPRS support node(s) (GGSN).

In addition to receiving and processing CS-switched traffic and signaling, gateway node(s) 1318 can authorize and authenticate PS-based data sessions with served (e.g., through macro RAN) wireless devices. Data sessions can include traffic exchange with networks external to the macro network platform 1310, like wide area network(s) (WANs) 1350; it should be appreciated that local area network(s) (LANs) can also be interfaced with macro network platform 1310 through gateway node(s) 1318. Gateway node(s) 1318 generates packet data contexts when a data session is established. To that end, in an aspect, gateway node(s) 1318 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1314. It is to be noted that in 3GPP UMTS network(s), gateway node(s) 1318 (e.g., GGSN) and tunnel interface (e.g., TTG) comprise a packet data gateway (PDG).

Macro network platform 1310 also includes serving node(s) 1316 that convey the various packetized flows of information or data streams, received through gateway node(s) 1318. As an example, in a 3GPP UMTS network, serving node(s) can be embodied in serving GPRS support node(s) (SGSN).

As indicated above, server(s) 1314 in macro network platform 1310 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1310. Data streams can be conveyed to gateway node(s) 1318 for authorization/authentication and initiation of a data session, and to serving node(s) 1316 for communication thereafter. Server(s) 1314 can also effect security (e.g., implement one or more firewalls) of macro network platform 1310 to ensure network's operation and data integrity in addition to authorization and authentication procedures that CS gateway node(s) 1312 and gateway node(s) 1318 can enact. Moreover, server(s) 1314 can provision services from external network(s), e.g., WAN 1350, or Global Positioning System (GPS) network(s) (not shown). It is to be noted that server(s) 1314 can include one or more processor configured to confer at least in part the functionality of macro network platform 1310. To that end, the one or more processor can execute code instructions stored in memory 1330, for example.

In example wireless environment 1300, memory 1330 stores information related to operation of macro network platform 1310. Information can include business data associated with subscribers; market plans and strategies, e.g., promotional campaigns, business partnerships; operational data for mobile devices served through macro network platform; service and privacy policies; end-user service logs for law enforcement; and so forth. Memory 1330 can also store information from at least one of telephony network(s) 1340, WAN(s) 1350, or SS7 network 1360, enterprise NW(s) 1365, or service NW(s) 1367.

Femto gateway node(s) 1384 have substantially the same functionality as PS gateway node(s) 1318. Additionally, femto gateway node(s) 1384 can also include substantially all functionality of serving node(s) 1316. In an aspect, femto gateway node(s) 1384 facilitates handover resolution, e.g., assessment and execution. Further, control node(s) 1320 can receive handover requests and relay them to a handover component (not shown) via gateway node(s) 1384. According to an aspect, control node(s) 1320 can support RNC capabilities.

Server(s) 1382 have substantially the same functionality as described in connection with server(s) 1314. In an aspect, server(s) 1382 can execute multiple application(s) that provide service (e.g., voice and data) to wireless devices served through femto RAN 1390. Server(s) 1382 can also provide security features to femto network platform. In addition, server(s) 1382 can manage (e.g., schedule, queue, format . . . ) substantially all packetized flows (e.g., IP-based, frame relay-based, ATM-based) it generates in addition to data received from macro network platform 1310. It is to be noted that server(s) 1382 can include one or more processor configured to confer at least in part the functionality of macro network platform 1310. To that end, the one or more processor can execute code instructions stored in memory 1386, for example.

Memory 1386 can include information relevant to operation of the various components of femto network platform 1380. For example operational information that can be stored in memory 1386 can comprise, but is not limited to, subscriber information; contracted services; maintenance and service records; femto cell configuration (e.g., devices served through femto RAN 1390; access control lists, or white lists); service policies and specifications; privacy policies; add-on features; and so forth.

It is noted that femto network platform 1380 and macro network platform 1310 can be functionally connected through one or more reference link(s) or reference interface(s). In addition, femto network platform 1380 can be functionally coupled directly (not illustrated) to one or more of external network(s) 1340, 1350, 1360, 1365 or 1367. Reference link(s) or interface(s) can functionally link at least one of gateway node(s) 1384 or server(s) 1386 to the one or more external networks 1340, 1350, 1360, 1365 or 1367.

Figure 14:
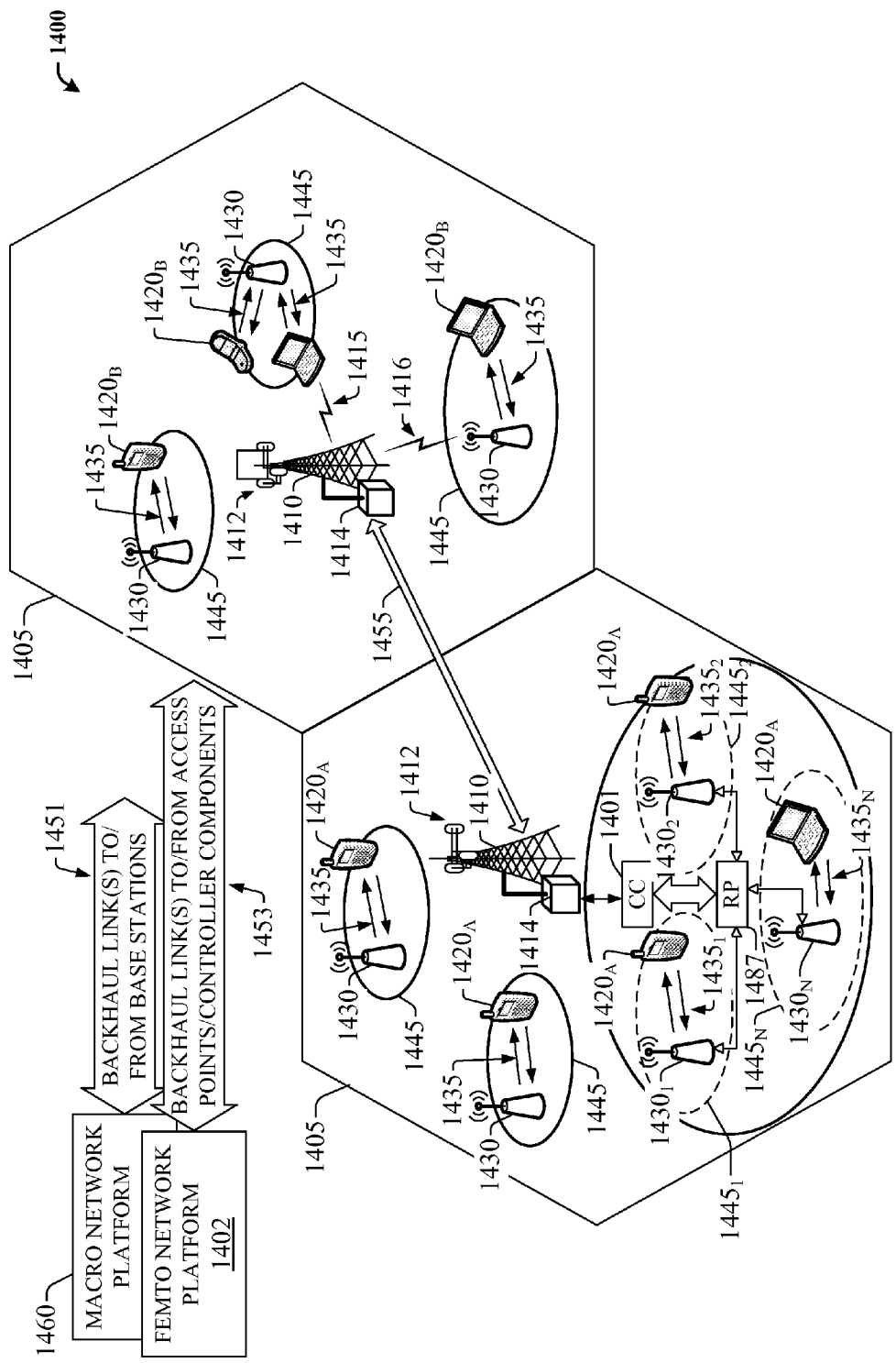
FIG. 14 illustrates a second example of a wireless communications environment with associated components that can be operable to a portion of the disclosed subject matter.

FIG. 14 illustrates a wireless environment that includes macro cells and femtocells for wireless coverage in accordance with aspects described herein. In wireless environment 1450, two areas 1405 represent "macro" cell coverage; each macro cell is served by a base station 1410. It can be appreciated that macro cell coverage area 1405 and base station 1410 can include functionality, as more fully described herein, for example, with regard to system 1400. Macro coverage is generally intended to serve mobile wireless devices, like UE $1420_A$, $1420_B$, in outdoors locations. An over-the-air wireless link 145 provides such coverage, the wireless link 1215 comprises a downlink (DL) and an uplink (UL), and utilizes a predetermined band, licensed or unlicensed, of the radio frequency (RF) spectrum. As an example, UE $1420_A$, $1420_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1410 communicates via backhaul link(s) 1451 with a macro network platform 1460, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1460 controls a set of base stations 1410 that serve either respective cells or a number of sectors within such cells. Base station 1410 comprises radio equipment 1414 for operation in one or more radio technologies, and a set of antennas 1412 (e.g., smart antennas, microwave antennas, satellite dish(es) . . . ) that can serve one or more sectors within a macro cell 1405. It is noted that a set of radio network control node(s), which can be a part of macro network platform; a set of base stations (e.g., Node B 1410) that serve a set of macro cells 1405; electronics, circuitry or components associated with the base stations in the set of base stations; a set of respective OTA wireless links (e.g., links 1415 or 1416 operated in accordance to a radio technology through the base stations; and backhaul link(s) 1455 and 1451 form a macro radio access network (RAN). Macro network platform 1460 also communicates with other base stations (not shown) that serve other cells (not shown). Backhaul link(s) 1451 or 1453 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1455 link disparate base stations 1410. According to an aspect, backhaul link 1453 can connect multiple femto access points 1430 and/or controller components (CC) 1401 to the femto network platform 1402. In one example, multiple femto APs can be connected to a routing platform (RP) 1487, which in turn can be connect to a controller component (CC) 1401. Typically, the information from UEs $1420_A$ can be routed by the RP 142, for example, internally, to another UE $1420_A$ connected to a disparate femto AP connected to the RP 1487, or, externally, to the femto network platform 1402 via the CC 1401, as discussed in detail supra.

In wireless environment 1450, within one or more macro cell(s) 1405, a set of femtocells 1445 served by respective femto access points (APs) 1430 can be deployed. It can be appreciated that, aspects of the subject innovation are geared to femtocell deployments with substantive femto AP density, e.g., $14^4$-$10^7$ femto APs 1430 per base station 1410. According to an aspect, a set of femto access points $1430_1$-$1430_N$, with N a natural number, can be functionally connected to a routing platform 1487, which can be functionally coupled to a controller component 1401. The controller component 1401 can be operationally linked to the femto network platform 330 by employing backhaul link(s) 1453. Accordingly, UE $1420_A$ connected to femto APs $1430_1$-$1430_N$ can communicate internally within the femto enterprise via the routing platform (RP) 1487 and/or can also communicate with the femto network platform 1402 via the RP 1487, controller component 1401 and the backhaul link(s) 1453. It can be appreciated that although only one femto enterprise is depicted in FIG. 14, multiple femto enterprise networks can be deployed within a macro cell 1405.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

With respect to FIG. 14, in example embodiment 1400, femtocell AP 1410 can receive and transmit signal(s) (e.g., traffic and control signals) from and to wireless devices, access terminals, wireless ports and routers, etc., through a set of antennas $1469_1$-$1169_N$. It should be appreciated that while antennas $1469_1$-$1469_N$ are a part of communication platform 1425, which comprises electronic components and associated circuitry that provides for processing and manipulating of received signal(s) (e.g., a packet flow) and signal(s) (e.g., a broadcast control channel) to be transmitted. In an aspect, communication platform 1425 includes a transmitter/receiver (e.g., a transceiver) 1466 that can convert signal(s) from analog format to digital format upon reception, and from digital format to analog format upon transmission. In addition, receiver/transmitter 1466 can divide a single data stream into multiple, parallel data streams, or perform the reciprocal operation. Coupled to transceiver 1466 is a multiplexer/demultiplexer 1467 that facilitates manipulation of signal in time and frequency space. Electronic component 1467 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1467 can scramble and spread information (e.g., codes) according to substantially any code known in the art; e.g., Hadamard-Walsh codes, Baker codes, Kasami codes, polyphase codes, and so on. A modulator/demodulator 1468 is also a part of operational group 1425, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1410 also includes a processor 1445 configured to confer functionality, at least partially, to substantially any electronic component in the femto access point 1410, in accordance with aspects of the subject innovation. In particular, processor 1445 can facilitate FAP 1410 to implement configuration instructions received through communication platform 1425, which can include storing data in memory 1455. In addition, processor 1445 facilitates FAP 1410 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1445 can manipulate antennas $1469_1$-$1469_N$ to facilitate beamforming or selective radiation pattern formation, which can benefit specific locations (e.g., basement, home office . . . ) covered by FAP; and exploit substantially any other advantages associated with smart-antenna technology. Memory 1455 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1455 can store configuration information such as schedules and policies; FAP address(es) or geographical indicator(s); access lists (e.g., white lists); license(s) for utilization of add-features for FAP 1410, and so forth.

In embodiment 1400, processor 1445 is coupled to the memory 1455 in order to store and retrieve information necessary to operate and/or confer functionality to communication platform 1425, broadband network interface 1435 (e.g., a broadband modem), and other operational components (e.g., multimode chipset(s), power supply sources . . . ; not shown) that support femto access point 1410. In addition, it is to be noted that the various aspects disclosed in the subject specification can also be implemented through (i) program modules stored in a computer-readable storage medium or memory (e.g., memory 1486 or memory 1455) and executed by a processor (e.g., processor 1445), or (ii) other combination(s) of hardware and software, or hardware and firmware.

Figure 15:
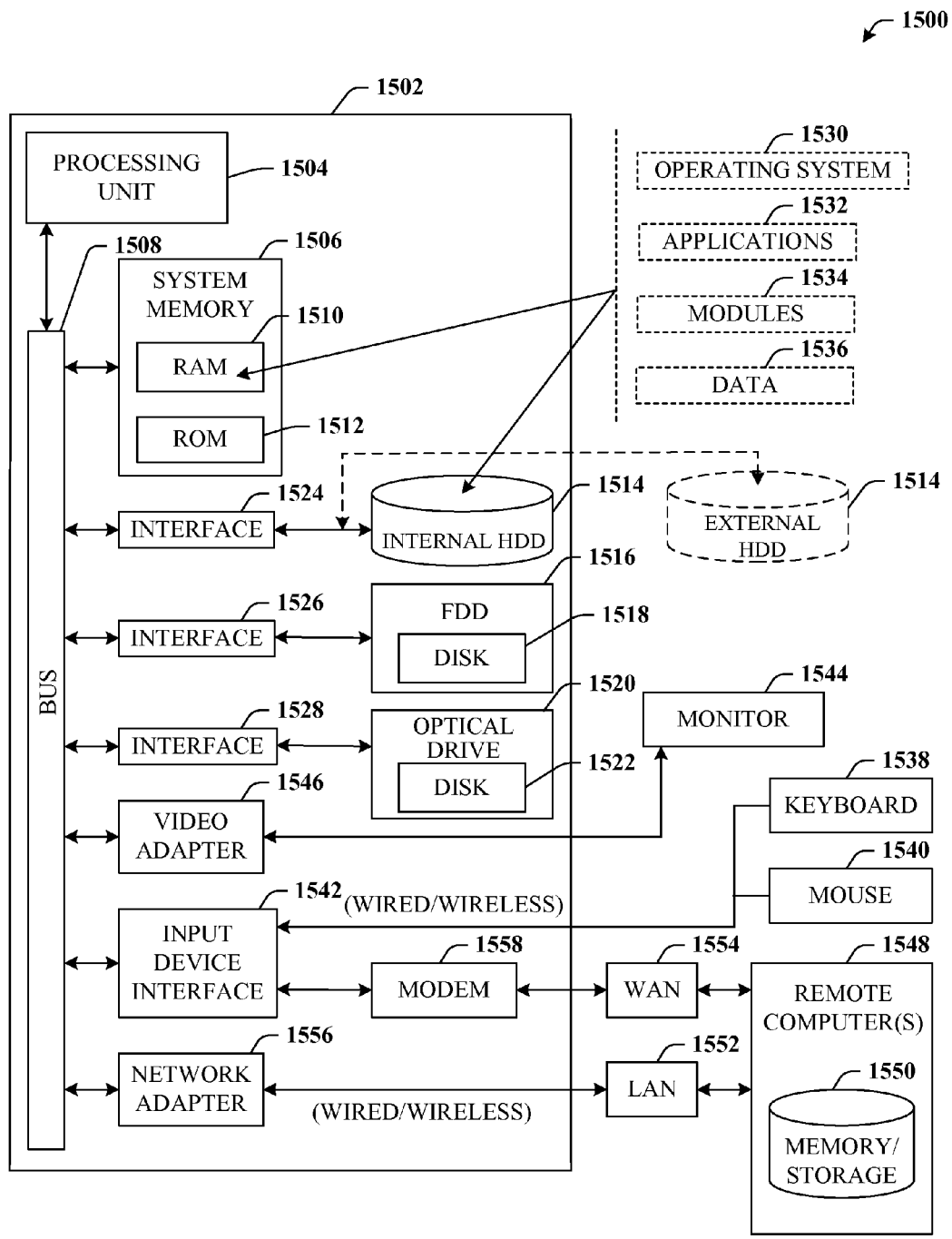
FIG. 15 illustrates a block diagram of an example computer operable to execute a portion of the disclosed architecture.

Referring now to FIG. 15, there is illustrated a block diagram of an exemplary computer system operable to execute the disclosed architecture. In order to provide additional context for various aspects of the disclosed subject matter, FIG. 15 and the following discussion are intended to provide a brief, general description of a suitable computing environment 1500 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Still referring to FIG. 15, the exemplary environment 1500 for implementing various aspects of the disclosed subject matter includes a computer 1502, the computer 1502 including a processing unit 1504, a system memory 1506 and a system bus 1508. The system bus 1508 couples to system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the disclosed subject matter can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, a mobile device, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WI-FI and Bluetooth™ wireless technologies. Thus, the communication can be a predefined structure as with a conventional network or simply an ad hoc communication between at least two devices.

WI-FI, or Wireless Fidelity, allows connection to the Internet from a couch at home, a bed in a hotel room, or a conference room at work, without wires. WI-FI is a wireless technology similar to that used in a cell phone that enables such devices, e.g., computers, to send and receive data indoors and out; anywhere within the range of a base station. WI-FI networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 15 Mbps (802.11b) or 54 Mbps (802.11a) data rate, for example, or with products that contain both bands (dual band), so the networks can provide real-world performance similar to the basic "10 BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A system, comprising:
   a memory to store instructions; and
   a processor, coupled to the memory, that facilitates execution of the instructions to perform operations, comprising:
      receiving data to be transmitted by way of a communication transaction via a network device of a network;
      determining that the data is tolerant to a delay;
      storing the data to a staging queue in response to the data being determined to be tolerant to the delay;
      receiving different data to be transmitted via the network device by way of a different communication transaction that differs from the communication transaction;
      transmitting the different data via the network device by way of the different communication transaction; and
      transmitting the data during an inactive period associated with the different communication transaction, wherein the inactive period is associated with an inactivity timer that begins in response to determining that the different data is not being transmitted by way of the different communication transaction.

2. The system of claim 1, wherein the determining comprises determining the data is tolerant to the delay based on input received from an application associated with the data.

3. The system of claim 1, wherein the transmitting the data comprises transmitting the data based on a network condition.

4. The system of claim 1, wherein the operations further comprise:
   processing the staging queue; and
   initiating a clearing communication transaction to transmit a portion of the data included in the staging queue.

5. The system of claim 4, wherein the clearing communications transaction is initiated based on a size of the data in the staging queue.

6. The system of claim 4, wherein the clearing communications transaction is initiated based on a length of time the data has been in the staging queue.

7. The system of claim 4, wherein the clearing communications transaction is initiated based on a degree of tolerance to the delay associated with the data in the staging queue.

8. The system of claim 1, wherein the inactive period occurs during a dedicated transport channel state associated with the different communication transaction.

9. The system of claim 8, wherein the operations further comprise transitioning from the dedicated transport channel state to a different state in response to a portion of the data in the staging queue being determined to have been transmitted.

10. The system of claim 9, wherein the transition from the dedicated transport channel state to the different state simulates a state transition determined to occur without data stored in the staging queue being transmitted.

11. A method, comprising:
    receiving, by a system comprising a processor, transmission data identified for transmission by way of a communication transaction via a network device of a network;
    determining, by the system, that the transmission data is delay-tolerant;
    storing, by the system, the transmission data in a queue in response to the transmission data being determined to be delay-tolerant;
    receiving, by the system, different transmission data to be transmitted by way of a different communication transaction that differs from the communication transaction;

determining, by the system, that the different data is not delay-tolerant;

transmitting, by the system, the different transmission data via the network device by way of the different communication transaction; and transmitting the transmission data during an inactive period associated with the different communication transaction, wherein the inactive period is associated with an inactivity timer that begins in response to determining that the different transmission data is not being transmitted by way of the different communication transaction.

12. The method of claim 11, wherein the determining that the transmission data is delay-tolerant comprises determining that the transmission data is delay-tolerant based on input received from an application associated with the transmission data.

13. The method of claim 11, wherein the determining that the transmission data is delay-tolerant comprises determining that the transmission data is delay-tolerant based on a classification of the transmission data according to a determined degree of delay-tolerance.

14. The method of claim 11, further comprising initiating, by the system, a clearing communication transaction to transmit at least a portion of the transmission data stored in the queue.

15. The method of claim 11, wherein inactivity timer is associated with a dedicated transport channel beginning to count, and wherein the dedicated transport channel is associated with the different communication transaction.

16. The method of claim 11, further comprising facilitating, by the system, a transition from a dedicated transport channel state to a different state in response to at least a portion of the transmission data being transmitted.

17. The method of claim 16, wherein the facilitating the transition comprises simulating an expected state transition for a state wherein the transmission data stored in the queue is not transmitted.

18. A non-transitory computer-readable storage medium comprising instructions that, in response to execution, cause a computer system comprising a processor to perform operations, comprising:

receiving transmission data to be transmitted via a communication transaction by way of a network device of a communications network;

determining that the transmission data is tolerant to a delay;

maintaining the transmission data in a queue in response to the transmission data being determined to be tolerant to the delay;

receiving different transmission data to be transmitted via a different communication transaction by way of the network device;

determining that the different transmission data is not tolerant to the delay;

transmitting the different transmission data via the communications network by way of the different communication transaction; and transmitting the transmission data during an inactive period associated with the different communication transaction, wherein the inactive period is associated with an inactivity timer that begins in response to determining that the different transmission data is not being transmitted by way of the different communication transaction.

19. The non-transitory computer-readable storage medium of claim 18, wherein the operations further comprising facilitating transitioning from a first energy state to a second energy state lower than the first energy state in response to at least a portion of the transmission data being transmitted.

20. The method of claim 19, wherein the facilitating transitioning comprises simulating a state transition that is expected for a state wherein the transmission data stored in the queue is not transmitted.

* * * * *